United States Patent
Fontana et al.

(10) Patent No.: US 12,122,875 B2
(45) Date of Patent: Oct. 22, 2024

(54) METHOD OF MAKING MIXTURE OF POLYMERS

(71) Applicant: SOLVAY SPECIALTY POLYMERS ITALY S.P.A., Bollate (IT)

(72) Inventors: Giovanni Fontana, Paderno Dugnano (IT); Marco Galimberti, Bollate (IT); Vito Tortelli, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 1027 days.

(21) Appl. No.: 17/048,684

(22) PCT Filed: Apr. 18, 2019

(86) PCT No.: PCT/EP2019/060085
§ 371 (c)(1),
(2) Date: Oct. 19, 2020

(87) PCT Pub. No.: WO2019/202079
PCT Pub. Date: Oct. 24, 2019

(65) Prior Publication Data
US 2021/0363299 A1    Nov. 25, 2021

(30) Foreign Application Priority Data
Apr. 20, 2018  (EP) .................................. 18168488

(51) Int. Cl.
| | | |
|---|---|---|
| *C08G 65/323* | (2006.01) | |
| *C08G 65/00* | (2006.01) | |
| *C08L 71/00* | (2006.01) | |
| *C08L 71/02* | (2006.01) | |

(52) U.S. Cl.
CPC ....... *C08G 65/3236* (2013.01); *C08G 65/007* (2013.01); *C08L 71/00* (2013.01); *C08L 71/02* (2013.01); *C08L 2205/02* (2013.01)

(58) Field of Classification Search
CPC ... C08G 65/3236; C08G 65/007; C08L 71/00; C08L 71/02; C08L 2205/02
See application file for complete search history.

(56) References Cited

U.S. PATENT DOCUMENTS

| | | | |
|---|---|---|---|
| 3,810,874 A | 5/1974 | Mitsch et al. | |
| 2004/0192974 A1 | 9/2004 | Navarrini et al. | |
| 2011/0136713 A1* | 6/2011 | Marchionni | ......... C10M 147/04 |
| | | | 568/669 |
| 2016/0137947 A1 | 5/2016 | Isobe et al. | |
| 2017/0369645 A1* | 12/2017 | Tonelli | ................. C08G 65/334 |

FOREIGN PATENT DOCUMENTS

| | | |
|---|---|---|
| GB | 1226566 A | 3/1971 |
| WO | 2010057691 A2 | 5/2010 |
| WO | 2017167705 A1 | 10/2017 |
| WO | 2019101771 A1 | 5/2019 |
| WO | 2019101827 A1 | 5/2019 |
| WO | 2019202076 A1 | 10/2019 |
| WO | 2019243403 A1 | 12/2019 |
| WO | 2019243404 A1 | 12/2019 |

OTHER PUBLICATIONS

Sir Allen G. et al., "Structure-Property Relationships in Perfluoropolyethers: A Family of Polymeric Oils", Comprehensive Polymer Science, Second Supplement, 1996, Chapter 9, pp. 347-388—Pergamon.

Avataneo M. et al., "Synthesis of alfa-omega-dimethoxyfluoropolyethers: reaction mechanism and kinetics", Journal of Fluorine Chemistry, 2005, vol. 126, pp. 633-639—Elsevier B.V.

Galimberti M. et al., "New catalytic alkylation of in situ generated perfluoro-alkyloxy-anions and perfluoro-carbanions", Journal of Fluorine Chemistry, 2005, vol. 126, pp. 1578-1586, XP055367797, DOI: doi:10.1016/j.jfluchem.2005.09.005—Elsevier B.V.

* cited by examiner

*Primary Examiner* — Shane Fang
(74) *Attorney, Agent, or Firm* — Osha Bergman Watanabe & Burton LLP

(57) ABSTRACT

The present invention relates to a process for the synthesis of partially and fully fluorinated polyether (PFPE) polymers, to PFPE polymers obtained therefrom and to the use of said PFPE polymers as intermediate compounds for the manufacture of additives for plastic and glass coating.

15 Claims, No Drawings

METHOD OF MAKING MIXTURE OF POLYMERS

CROSS REFERENCE TO RELATED APPLICATIONS

This application is a U.S. national stage entry under 35 U.S.C. § 371 of International Application No. PCT/EP2019/060085 filed Apr. 18, 2019, which claims priority from European application No. 18168488.7, filed on Apr. 20, 2018. The entire contents of these applications are explicitly incorporated herein by this reference.

TECHNICAL FIELD

The present invention relates to a process for the synthesis of partially and fully fluorinated polyether (PFPE) polymers, to PFPE polymers obtained therefrom and to the use of said PFPE polymers as intermediate compounds for the manufacture of additives for plastic and glass coating.

BACKGROUND ART

Among fluorinated polymers, (per)fluoropolyether polymers (PFPEs) are well-known and of great interest for their chemical and physical properties, which make them particularly interesting as lubricants.

Several synthesis of PFPEs polymers have been disclosed in the art. The first synthesis of unspecified perfluorinated polyether mixtures was reported in 1953, when an oily product was obtained in the course of photoligomerization of hexafluoropropene. Since then, a number of different perfluorinated polyethers have been synthesized and described in literature. (ALLEN, Geoffrey, et al. COMPREHENSIVE POLYMER SCIENCE—Second supplement. Edited by SIR ALLEN, Geoffrey, et al. Elsevier Science, 1996. ISBN 0080427081. p. 347-388.).

For example, the catalytic polymerization of perfluoroepoxides, such as notably hexafluoropropylene oxide (HFPO), firstly disclosed by Du Pont researchers, led to a product commercially available under the trade name Krytox®, which backbone comprises recurring units of formula —[CF(CF$_3$)CF$_2$O]$_y$—. Then, Montedison researchers disclosed the photochemical oxidation of perfluoro-olefins, such as tetrafluoroethylene and hexafluoropropene, which led to a product commercially available under the trade name Fomblin®, which backbone comprises randomly distributed recurring units of formula —[(CF$_2$O)$_m$(CF$_2$CF(R)O)$_n$]— wherein R is —F or —CF$_3$. Another synthesis, which involved the ring opening polymerization of partially fluorinated oxetanes followed by fluorination, was disclosed by Daikin Company and led to a product commercially available under the trade name Demnum®, which backbone comprises recurring units of formula —(CF$_2$CF$_2$CF$_2$O)$_p$—.

The main difference between the (per)fluoropolyether polymers known in the art resides in the fact that Krytox® polymers and Demnum® polymers are homopolymers characterized by an ordered structure, which comprises only one type of recurring unit, i.e. —[CF(CF$_3$)CF$_2$O]$_y$— and —(CF$_2$CF$_2$CF$_2$O)$_p$—, respectively. Differently, Fomblin® polymers are copolymers characterized by the presence of two or more recurring units having a different formula and being randomly distributed (also defined as statistically distributed) along the backbone chain. This random distribution of the recurring units is due to the manufacturing process based on photochemical oxidation of perfluoroolefins. However, the random distribution of the recurring units could led to a backbone chain comprising multiple consecutive recurring units having one carbon atoms (i.e., of formula —CF$_2$O—), which on the one hand increase the flexibility of the polymer backbone but on the other hand constitute a weak point in the polymer backbone, as they are more easily attacked by metals and/or Lewis acids.

Partially fluorinated compounds and methods for their preparation have been disclosed in the art.

For example in US 20040192974 (SOLVAY SOLEXIS S.P.A.), which discloses a process for obtaining hydrofluoroether compounds comprising a (per)fluoroxyalkylene chain containing recurring units that are statistically distributed along the chain.

Also, WO 2010/057691 (SOLVAY SOLEXIS S.P.A.) discloses the synthesis of hydrofluoroalcohols of formula (I):

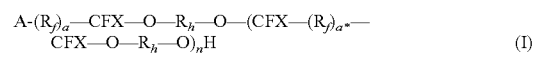

$$A\text{-}(R_f)_a\text{—}CFX\text{—}O\text{—}R_h\text{—}O\text{—}(CFX\text{—}(R_f)_{a^*}\text{—}CFX\text{—}O\text{—}R_h\text{—}O)_n H \quad (I)$$

wherein R$_h$ is a divalent C1-C20 hydrocarbon-based residue,

X is F or a C1-C6-(per)fluoroalkyl,

R$_f$ is a (per)fluoro(poly)oxyalkylene (PFPE) chain or a (per)fluoroalkyl chain. According to the preferred embodiment, R$_f$ is a PFPE chain comprising one or more recurring units of formula —(C$_3$F$_6$O)—, —(CF$_2$O)—, —(CF$_2$CF$_2$O)—, —(CF$_2$CF$_2$CF$_2$O)—, —(CF$_2$CF$_2$CF$_2$CF$_2$O)—, —[CF(CF$_3$)O]—, which are statistically (i.e. randomly) distributed along the chain.

None of the above mentioned documents however discloses or suggests either partial or complete fluorination (perfluorination) reaction of the hydrofluoro compounds obtained therein.

The synthesis of alfa-omega-dimethoxyfluoropolyethers was disclosed in AVATANEO, Marco, et al. Synthesis of alfa-omega-dimethoxyfluoropolyethers: reaction mechanism and kinetics. *Journal of Fluorine Chemistry*. 2005, vol. 126, p. 633-639. and in GALIMBERTI, Marco, et al. New catalytic alkylation of in situ generated perfluoro-alkyloxyanions and perfluoro-carbanions. *Journal of Fluorine Chemistry*. 2005, vol. 126, p. 1578-1586. However, the synthesis disclosed in these articles started from alkyl fluoroformate and perfluoropolyether diacyl fluoride, the latter being obtained by photopolymerization. In other words, the perfluoropolyether comprises at one chain end the group of formula —C(O)F, but it also comprises recurring units of formula —(CF$_2$CF$_2$O)— and —(CF$_2$O)— that are randomly distributed within the backbone of the polymer.

US 2016137947 (ASAHI GLASS COMPANY LIMITED) discloses fluorinated polyether compounds complying with formula: {X—O—[(CF$_2$CF$_2$O)$_a$—(CF$_2$CF$_2$CF$_2$CF$_2$O)$_b$]}$_m$—Y—{[(OCF$_2$CF$_2$)$_c$—(OCF$_2$CF$_2$CF$_2$CF$_2$)$_d$]—O—Z}$_n$ wherein m is from 1 to 10;

n is from 0 to 10;

X is a group having a hydroxy group, a carboxy group, an ester group or an aryl group;

Y is an (m+n) valent alkane group, an (m+n) valent alkane group having an etheric oxygen atom inserted between carbon-carbon atoms, an (m+n) valent fluoroalkane group, an (m+n) valent fluoroalkane group having an etheric oxygen atom inserted between carbon-carbon atoms, or a cyclotriphosphazene structure (P$_3$N$_3$); and Z is a group not having a hydroxy group, a carboxy group, an ester group or an aryl group, and having a haloalkyl group (provided that the halogen atom is a fluorine atom or a chlorine atom) or a haloalkyl group (provided that the halogen atom is a fluorine atom or a chlorine atom) having an etheric oxygen inserted between carbon-carbon atoms. In the moiety —[(CF$_2$CF$_2$O)$_a$—(CF$_2$CF$_2$CF$_2$CF$_2$O)$_b$]— the linking order of "a" number of units (CF$_2$CF$_2$O) and "b" number of units (CF$_2$CF$_2$CF$_2$CF$_2$O) is not limited, i.e. units (CF$_2$CF$_2$O) and (CF$_2$CF$_2$CF$_2$CF$_2$O) may be randomly located, alternately arranged or at least one block consisting of a plurality of units (CF$_2$CF$_2$O) and units (CF$_2$CF$_2$CF$_2$CF$_2$O) may be linked. Structures having the following formula are preferred —CF$_2$CF$_2$O(CF$_2$CF$_2$CF$_2$CF$_2$OCF$_2$CF$_2$O)$_e$— wherein e is from 1 to 99.

SUMMARY OF INVENTION

The Applicant faced the problem of preparing perfluoropolyether polymers mixtures having a pre-defined chemical structure, i.e. perfluoropolyether polymers characterized by recurring units which distribution in the polymer backbone is non-random but defined a priori, and wherein the fraction of reactive groups which could be further functionalized or conferring peculiar reactivity, also known as functional groups, can be opportunely tuned.

Similarly, there's an unfilled need in the art for perfluoropolyether polymers mixtures with well-defined sequences of recurring units, and wherein the average functionality and/or relative concentration of the reactive end chains may be achieved without burdensome purification/separation processes.

Surprisingly, the Applicant found a process, which can be conveniently applied on industrial scale, for the synthesis of mixtures of compounds, having recurring units not randomly distributed in the backbone chain, whereas the nature of end group can be adequately tuned.

Thus, in a first aspect, the present invention relates to a method [method (P$_{FH}$)] for the synthesis of a mixture of polymers [polymer mixture (FH$_{CH2F}$)] comprising a partially fluorinated polyether backbone having two chain ends, each of said chain ends being linked to an opposite side of said backbone, wherein each of the first chain end [end (Re$_1$)] and the second chain end [end (Re$_2$)] is independently selected from the group consisting of —CR$_H^1$R$_H^2$—OC(=O)F, —C(=O)F, and —CR$_H^1$R$_H^2$F, with R$_H^1$ and R$_H^2$, equal to or different from each other, are each independently H or a C$_1$-C$_6$ hydrocarbon group;

said process comprising:

Step (I): a step of contacting:
at least one perfluoro compound [compound (F)] comprising at least two acyl-fluoride groups; and
at least one hydrogenated compound [compound (H)] comprising at least two fluoroformate groups of formula —CR$_H^1$R$_H^2$—O—C(O)F, in the presence of at least one fluoride-containing compound,
to provide a mixtures of polymers [polymer (FH$_{FOR}$)] comprising a partially
fluorinated polyether backbone having two chain ends, wherein said backbone comprises recurring unit(s) derived from said at least one compound (F) alternately arranged with recurring unit(s) derived from said at least one compound (H), and wherein each of said chain ends, equal to or different from each other, is selected from the group consisting of a group —CR$_H^1$R$_H^2$—OC(=O)F and a group —C(=O)F;

Step (II): a step of heating said polymer (FH$_{FOR}$) obtained in step (I) above at a temperature exceeding 120° C., preferably in the range from 130° C. to 210° C., for a duration of at least 4 hours and in the presence of a fluoride-containing compound, typically in the presence of a fluoride-containing compound comprising at least one of (i) a metal fluoride of formula MeF$_y$, with Me being a metal having y valence, y being 1 or 2, in particular NaF, CaF$_2$, AgF, RbF, CsF, KF; and (ii) an (alkyl)ammonium fluoride of formula NR$^{HN}_4$F, with each of R$^{HN}$, equal to or different from each other being, independently, a H or an alkyl group, in particular tetrabutylammonium fluoride, so effecting the thermolysis of at least a fraction of the chain ends of polymer (FH$_{FOR}$) of formula —CR$_H^1$R$_H^2$—OC(=O)F to groups —CR$_H^1$R$_H^2$—F, to provide polymer mixture (FH$_{CH2F}$), as detailed above.

Then, in a second aspect, the present invention pertains to a polymer mixture (FH$_{CH2F}$), as above detailed, wherein the concentration of chain ends of formula —CR$_H^1$R$_H^2$—F exceed the concentration of chain ends of formula —CR$_H^1$R$_H^2$—OC(=O)F.

Other aspects and objects of the invention will appear in the detailed description hereunder.

DESCRIPTION OF EMBODIMENTS

For the purpose of the present description and of the following claims:

the use of parentheses around symbols or numbers identifying the formulae, for example in expressions like "polymer mixture (PH$_{FOR}$)", etc., has the mere purpose of better distinguishing the symbol or number from the rest of the text and, hence, said parenthesis can also be omitted;

the term "(per)fluoropolyether" is intended to indicate polyether polymer(s) comprising a fully fluorinated or partially fluorinated backbone;

the term "perfluoropolyether" is intended to indicate polyether polymer(s) comprising a fully fluorinated backbone.

Preferably, said compound (F) is a compound of formula:

F—C(=O)—R$_f$—C(=O)—F wherein R$_f$ is a divalent, perfluoro linear or branched (oxy)alkylene chain, wherein said alkylene chain comprises from 1 to 10 carbon atoms and is optionally interrupted by one or more oxygen atoms.

More preferably, said perfluoro (oxy)alkylene group is a linear alkylene group, i.e. a group consisting of a sequence of —CF$_2$—, possibly including one or more than one ethereal oxygen —O—.

More preferably, said perfluoro (oxy)alkylene group comprises from 1 to 5 carbon atoms, even more preferably from 1 to 4 carbon atoms.

According to preferred embodiments, said compound (F) is selected from the group comprising:

(F-i) FC(O)—CF$_2$—C(O)F;
(F-ii) FC(O)—CF$_2$—CF$_2$—C(O)F;
(F-iii) FC(O)—CF$_2$—CF$_2$—CF$_2$—C(O)F;
(F-iv) FC(O)—CF$_2$—CF$_2$—CF$_2$—CF$_2$—C(O)F;
(F-v) FC(O)—CF$_2$—O—CF$_2$—C(O)F.

As mentioned above, compound (H) is hydrogenated, that is to say that hydrogen atoms saturate all free valences on carbon atoms of the same, except as per the fluorine atom of the fluoroformate groups —$CH_2$—OC(O)—F.

Preferably, said compound (H) is a compound of formula:

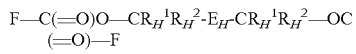

wherein $E_H$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;

each of $R_H^1$ and $R_H^2$, equal to or different from each other at each occurrence, is independently H or a $C_1$-$C_6$ hydrocarbon group.

More preferably, said (oxy)alkylene group of $E_H$ is linear (oxy)alkylene group, i.e. a group consisting of a sequence of —$CH_2$—, possibly including one or more than one ethereal oxygen —O—.

More preferably, said (oxy)alkylene group comprises from 1 to 10 carbon atoms, even more preferably from 1 to 6 carbon atoms, and still more preferably from 1 to 4 carbon atoms.

More preferably, each of $R_H^1$ and $R_H^2$, equal to or different from each other at each occurrence, is independently H or a $C_1$-$C_3$ alkyl group; more preferably H or —$CH_3$; most preferably, is H.

Preferably, said compound (H) is selected from the group consisting of:
(H-j) F—C(O)—O—$(CH_2)_2$—O—C(O)—F,
(H-jj) F—C(O)—O—$(CH_2)_3$—O—C(O)—F,
(H-jjj) F—C(O)—O—$(CH_2)_4$—O—C(O)—F,
(H-jv) F—C(O)—O—$(CH_2)_5$—O—C(O)—F, and
(H-v) F—C(O)—O—$(CH_2)_2$—O—$(CH_2)_2$—O—C(O)—F.

While the molar ratio between said compound (H) and said compound (F) in Step (I) of the method of the invention is not particularly limited, it is generally understood that such ratio is generally adjusted to be within 5.0:1.0 to 1:0:5.0, preferably within 2.0:1.0 to 1.0:2.0, more preferably within 1.3:1.0 to 1.0:1.3, and even more preferably within 1.1:1.0 to 1.0:1.1, which means that the excess of acyl fluoride or fluoroformiate is generally of at most 500% by moles, preferably of at most 200% moles, more preferably at most 30% by moles, even more preferably at most 10% by moles.

As said, step (I) of the method of the invention is performed in the presence of a fluoride-containing compound, more preferably in the presence of a fluoride-containing compound comprising at least one of (i) a metal fluoride of formula $MeF_y$, with Me being a metal having y valence, y being 1 or 2, in particular NaF, $CaF_2$, AgF, RbF, CsF, KF; and (ii) an (alkyl)ammonium fluoride of formula $NR^{HN}_4F$, with each of $R^{HN}$, equal to or different from each other being, independently, a H or an alkyl group, in particular tetrabutylammonium fluoride.

Said fluoride-containing compounds may be neat metal fluorides or neat (alkyl) ammonium fluorides, as above detailed, or maybe compounds whereas the said fluorides are supported onto an inert support, such as charcoal, alumina, silica, zeolites, and the like.

It is generally understood, although other mechanisms may also explain the observed reactivity, that in Step (I) of the method of the invention, reaction between compound (F) and compound (H) occurs through formation of a —$CF_2$—O— nucleophile by reaction of fluoride with an acyl fluoride group of compound (F) and subsequent nucleophilic substitution of the same on the fluoroformate group of compound (H), with release of carbon dioxide and fluoride.

As a consequence, the said fluoride-containing compound can be used in catalytic amounts, being understood that fluoride anions will not be substantially consumed in Step (I).

Caesium fluoride (CsF), potassium fluoride (KF), silver fluoride (AgF), Rubidium fluoride (RbF) and tetra-n-butylammonium fluoride are the preferred fluoride-containing compounds which can be used in Step (I) of the method of the invention.

Preferably, Step (I) is performed in the presence of a solvent, more preferably in the presence of a polar aprotic solvent, although embodiments whereas no solvent is used and compounds (F) and (H) are used as reactive medium are also encompassed by the method of the invention.

When used, preferably, said polar aprotic solvent is selected in the group comprising, more preferably consisting of, dimethoxyethane (glyme), bis(2-methoxyethyl) ether (diglyme), triethylene glycol dimethyl ether (triglyme), tetraethylene glycol dimethyl ether (tetraglyme), tetrahydrofuran, acetonitrile, dimethyl sulfoxide, dimethylformamide, ethylene polyoxides dimethylethers. Tetraglyme and acetonitrile being more preferred.

Step (I) can be performed by adding said compound (F) to said compound (H), or viceversa by adding said compound (H) to said compound (F). According to a preferred embodiment, said compound (F) and said compound (H) are added to the reaction environment and then reaction is triggered by e.g. increase of temperature and/or addition of the said source of fluoride.

Step (I) is generally carried out at a temperature of at least 60° C., preferably of at least 80° C., more preferably at least 90° C., even more preferably of at least 110° C.

Upper boundaries for reaction temperature in Step (I) are not particularly limited; it is nevertheless generally understood that Step (I) will be carried out at a temperature which is below the temperature of Step (II), and which is generally of at most 120° C.

Preferably, after step (I), the backbone of polymer chains of said polymer mixture ($FH_{FOR}$) consists essentially of a sequence of recurring units of formula ($FH_{unit}$):

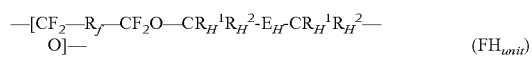

wherein
$R_f$ has the same meanings defined above for compound (F),
$E_H$, $R_H^1$ and $R_H^2$ have the same meanings defined above for compound (H).

The expression "consists essentially" as used above for characterizing the backbone of polymer chains of polymer mixture ($FH_{FOR}$) is intended to mean that the said chain may comprise, in addition to the sequence of recurring units ($FH_{unit}$), a minor amount of defects and/or spurious units which may derive by side reactions, being understood that the amount thereof will be such not to substantially modify the properties of the polymer mixture ($FH_{FOR}$), e.g. an amount of less than 1% moles, with respect to the overall amount of recurring units of polymer chains of polymer mixture ($FH_{FOR}$).

The number-averaged molecular weight of said polymer ($FH_{FOR}$) is from 210 to 50,000, preferably from 380 to 30,000, more preferably from 450 to 8,000, and even more preferably from 500 to 3,000.

Polymer mixture ($FH_{FOR}$) is generally a mixture comprising (preferably essentially consisting of) variable amounts of any of compounds of formula:

(1)

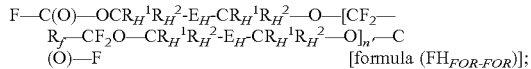
[formula ($FH_{FOR-FOR}$)];

(2)

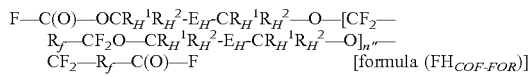
[formula ($FH_{COF-FOR}$)]

(3)

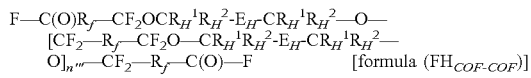
[formula ($FH_{COF-COF}$)]

wherein n', n", and n'" are integers such that the molecular weight of the polymer ($FH_{FOR}$) is within the above recited boundaries, i.e. from 210 to 50,000, preferably from 380 to 30,000, more preferably from 450 to 8,000, and even more preferably from 500 to 3,000; and $R_f$, $E_H$, $R_H^1$ and $R_H^2$ have the meanings as detailed above.

The expression "essentially consisting" when used in combination with the expression "polymer mixture ($FH_{FOR}$)" for characterizing components amounting the polymer mixture ($FH_{FOR}$) is understood to mean that additional compounds which maybe formed because of side-reactions or because of the presence of impurities and/or spurious ingredients, may be present in the mixture It will be clear to those skilled in the art, that while the reaction conditions of step (I) are controlled, relative amounts of compounds ($FH_{FOR-FOR}$), ($FH_{COF-FOR}$) and ($FH_{COF-COF}$) can be adjusted, considering notably stoichiometry of the reaction, and reactivity of compound (H) and compound (F).

It is nevertheless generally understood that, acting notably on relative molar amounts of compound (F) and compound (H), considering reactivity of —COF and —O—C(O)—F groups under different reaction conditions, the method of the invention can be tuned to lead polymer mixture ($FH_{FOR}$) comprising compounds of any of formulae ($FH_{FOR-FOR}$), ($FH_{COF-FOR}$) and ($FH_{COF-COF}$), as above detailed, in amounts such that the concentration of compound of formula ($FH_{COF-FOR}$) is the major ingredient of the polymer mixture ($FH_{FOR}$).

According to these embodiments, polymer mixture ($FH_{FOR}$) comprises compounds of any of formulae ($FH_{FOR-FOR}$), ($FH_{COF-FOR}$) and ($FH_{COF-COF}$), as above detailed, in amounts such that the concentration of chain ends of formula —$CR_H^1R_H^2$—OC(=O)F, with $R_H^1$ and $R_H^2$ having the meaning as detailed above, is of at least 40% moles, preferably at least 45% moles, and more preferably at least 50% moles, with respect to the total moles of chain ends in polymer mixture ($FH_{FOR}$), and/or of at most 75% moles, preferably at most 60% moles.

Similarly, process parameter of Step (I) of the method invention can be adapted to ensure the method of the invention leads to a polymer mixture ($FH_{FOR}$) comprising compounds of any of formulae ($FH_{FOR-FOR}$), ($FH_{COF-FOR}$) and ($FH_{COF-COF}$), as above detailed, in amounts such that the concentration of compound of formula ($FH_{FOR-FOR}$) is the major ingredient of the polymer mixture ($FH_{FOR}$).

According to these embodiments, polymer mixture ($FH_{FOR}$) comprises compounds of any of formulae ($FH_{FOR-FOR}$), ($FH_{COF-FOR}$) and ($FH_{COF-COF}$), as above detailed, in amounts such that the concentration of chain ends of formula —$CR_H^1R_H^2$—OC(=O)F, with $R_H^1$ and $R_H^2$ having the meaning detailed above, is of more than 60% moles, preferably at least 65% moles, and more preferably at least 70% moles, with respect to the total moles of chain ends in polymer mixture ($FH_{FOR}$).

More generally, as said, in Step (II) of the method of the invention, thermolysis of at least a fraction of the chain ends of polymer mixture ($FH_{FOR}$) of formula —$CR_H^1R_H^2$—OC(=O)F to groups —$CR_H^1R_H^2$—F occurs, whereas $R_H^1$ and $R_H^2$ have the meaning detailed above.

Step (II) could be a separated step from Step (I) or may occur simultaneously as Step (I), as the reaction between polymer (F) and polymer (H) progresses, depending on the temperature in Step (I).

Nevertheless, in order to achieve substantial thermolysis of chain ends of formula —$CR_H^1R_H^2$—OC(=O)F to groups —$CR_H^1R_H^2$—F, it is essential for Step (II) to include heating at a temperature exceeding 120° C., and preferably of at least 130° C., even more preferably of at least 140° C. for a duration of at least 4 hours.

As said, in said Step (II), a fluoride-containing compound has to be present, for effectively catalyse the said thermolysis of said of chain ends of formula —$CR_H^1R_H^2$—C(=O)F to groups —$CR_H^1R_H^2$—F.

The said fluoride-containing compound may be the same compound as used in Step (I) or may be a different compound. Generally, preferred are embodiment's wherein Step (I) and Step (II) are carried out in the presence of the same fluoride-containing compound, and wherein the said fluoride-containing compound is added to the reaction mixture used in Step (I), and is hence present in appropriate amount in the polymer mixture ($FH_{FOR}$).

In case the amount of fluoride-containing compound present in polymer mixture ($FH_{FOR}$) is not appropriate for optimizing the thermolysis conditions in Step (II), it may be possible:

either to separate at least a fraction of the fluoride-containing compound present in polymer mixture ($FH_{FOR}$), in case its amount, at the end of Step (I), is too high; or to add at least a fraction of additional fluoride-containing compound to polymer mixture ($FH_{FOR}$), in case its amount, at the end of Step (I), is too low.

As said, Step (II) of method of the invention effects thermolysis of at least a fraction of the chain ends of polymer mixture ($FH_{FOR}$) of formula —$CR_H^1R_H^2$—OC(=O)F to groups —$CR_H^1R_H^2$—, so as to obtain a polymer mixture ($FH_{CH2F}$).

The number-averaged molecular weight of said polymer mixture ($FH_{CH2F}$) is advantageously of from 210 to 50,000, preferably from 380 to 30,000, more preferably from 450 to 8,000, and even more preferably from 500 to 3,000.

Polymer mixture ($FH_{CH2F}$) is generally a mixture comprising (preferably essentially consisting of) variable amounts of any of compounds of formula:

(a)

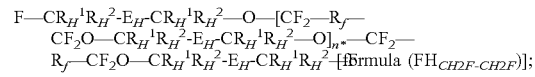
[formula ($FH_{CH2F-CH2F}$)];

(b)

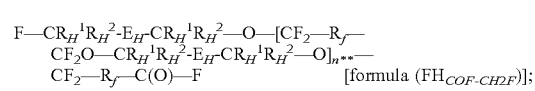
[formula ($FH_{COF-CH2F}$)];

(c)

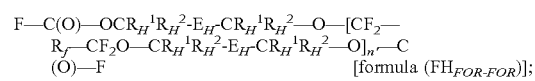
[formula ($FH_{FOR-FOR}$)];

(d)

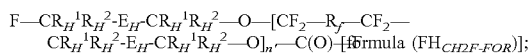

(e)

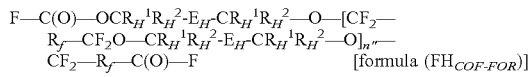

(f)

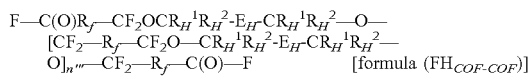

wherein n*, n**, n', n", and n''' are integers such that the molecular weight of the polymer mixture ($FH_{CH2F}$) is within the above recited boundaries, and wherein $R_f$, $E_H$, $R_H^1$ and $R_H^2$ are as above detailed.

The skilled in the art will recognize that compounds (c), (d), (e) and (f) herein above, are indeed representative of un-reacted (c, e, f) or partially reacted (d) components of polymer mixture ($FH_{FOR}$).

Among those compound, in polymer mixture ($FH_{CH2F}$):
the concentration of compound of formula ($FH_{CH2F-CH2F}$), as above detailed, is higher than the concentration of compound of formula ($FH_{FOR-FOR}$), as above detailed; and/or
the concentration of compound of formula ($FH_{COF-CH2F}$), as above detailed, is higher than the concentration of compound of formula ($FH_{COF-FOR}$)].

Generally, conditions in Step (II) are adapted so as to cause thermolysis of more than 50%, preferably more than 60%, more preferably more than 70% of chain ends of polymer mixture ($FH_{FOR}$) of formula —$CR_H^1R_H^2$—OC(=O)F, with respect to the total amount of said chain ends of formula —$CR_H^1R_H^2$—OC(=O)F, as resulting from Step (I), with $R_H^1$ and $R_H^2$ having the meaning as detailed above.

The Applicant noted that that by tuning heating temperature and heating duration in Step (II), a complete or partial transformation of said groups —OC(=O)F into groups —$CR_H^1R_H^2$F can be obtained, with $R_H^1$ and $R_H^2$ having the meaning as detailed above.

A polymer mixture ($FH_{CH2F}$), as above detailed, wherein the concentration of chain ends of formula —$CR_H^1R_H^2$—F (preferably of formula —$CH_2$—F) exceed the concentration of chain ends of formula —$CR_H^1R_H^2$—OC(=O)F (preferably of formula —$CH_2$—OC(=O)F), is another aspect of the present invention, with $R_H^1$ and $R_H^2$ having the meaning as detailed above.

According to certain preferred embodiments, the method of the invention can be adjusted to provide a polymer mixture ($FH_{CH2F}$) comprising an amount of compounds (F—$CR_H^1R_H^2$-$E_H$-$CR_H^1R_H^2$—O—[$CF_2$—$R_f$—$CF_2O$—$CR_H^1R_H^2$-$E_H$-$CR_H^1R_H^2$—O]$_{n**}$—$CF_2$—$R_f$—C(O)—F, of formula ($FH_{COF-CH2F}$), as above detailed,
wherein $E_H$, $R_f$, n**, $R_H^1$ and $R_H^2$ have the meaning as detailed above, of at least 60% moles, preferably of at least 70% moles, more preferably at least 80% moles, with respect to the total moles of compounds of formula ($FH_{CH2F-CH2F}$), formula ($FH_{COF-CH2F}$), formula ($FH_{FOR-FOR}$), formula ($FH_{CH2F-FOR}$), formula ($FH_{COF-FOR}$), and formula ($FH_{COF-COF}$), as above detailed. We'll refer to this mixture as polymer mixture ($FH_{CH2F}^{MONO}$)

To lead to the mixture ($FH_{CH2F}^{MONO}$), molar ratio between compound (H) and compound (F) in Step (I) will be adapted to provide for a mixture ($FH_{FOR}$), comprising compound F—C(O)—OC$R_H^1R_H^2$-$E_H$-$CR_H^1R_H^2$—O—[$CF_2$—$R_f$—$CF_2O$—$CR_H^1R_H^2$-$E_H$-$CR_H^1R_H^2$—O]$_{n'''}$—$CF_2$—$R_f$—C(O)—F of formula ($FH_{COF-FOR}$), wherein $E_H$, $R_f$, n''', $R_H^1$ and $R_H^2$ have the meaning as detailed above, of at least 60% moles, preferably of at least 70% moles, more preferably at least 80% moles, with respect to the total moles of compounds of formula ($FH_{FOR-FOR}$), formula ($FH_{COF-FOR}$), and formula ($FH_{COF-COF}$), as above detailed (hereby referred to as polymer mixture ($FH_{FOR}^{MONO}$); which mixture upon thermolysis in Step (II), under appropriate conditions, would lead to said mixture ($FH_{CH2F}^{MONO}$).

According to other embodiments, the method of the invention can be adjusted to provide a polymer mixture ($FH_{CH2F}$) comprising an amount of compounds F—$CR_H^1R_H^2$-$E_H$-$CR_H^1R_H^2$—O—[$CF_2$—$R_f$—$CF_2O$—$CR_H^1R_H^2$-$E_H$-$CR_H^1R_H^2$—O]$_{n*}$—$CF_2$—$R_f$—$CF_2O$—$CR_H^1R_H^2$-$E_H$-$CR_H^1R_H^2$—F, formula ($FH_{CH2F-CH2F}$), as above detailed, wherein $E_H$, $R_f$, n*, $R_H^1$ and $R_H^2$ have the meaning as detailed above,
of at least 60% moles, preferably of at least 70% moles, more preferably at least 80% moles, with respect to the total moles of compounds of formula ($FH_{CH2F-CH2F}$), formula ($FH_{COF-CH2F}$), formula ($FH_{FOR-FOR}$), formula ($FH_{CH2F-FOR}$), formula ($FH_{COF-FOR}$), and formula ($FH_{COF-COF}$), as above detailed. We'll refer to this mixture as polymer mixture ($FH_{CH2F}^{NEUTRAL}$)

To lead to the mixture ($FH_{CH2F}^{NEUTRAL}$) molar ratio between compound (H) and compound (F) in Step (I) will be adapted to provide for a mixture ($FH_{FOR}$), comprising compound F—C(O)—OC$R_H^1R_H^2$-$E_H$-$CR_H^1R_H^2$—O—[$CF_2$—$R_f$—$CF_2O$—$CR_H^1R_H^2$-$E_H$-$CR_H^1R_H^2$—O]$_{n'}$—C(O)—F of formula ($FH_{FOR-FOR}$), wherein $E_H$, $R_f$, n', $R_H^1$ and $R_H^2$ have the meaning as detailed above,
of at least 60% moles, preferably of at least 70% moles, more preferably at least 80% moles, with respect to the total moles of compounds of formula ($FH_{FOR-FOR}$), formula ($FH_{COF-FOR}$), and formula ($FH_{COF-COF}$), as above detailed (hereby referred to as polymer mixture ($FH_{FOR}^{NEUTRAL}$); which mixture upon thermolysis in Step (II), under appropriate conditions, would lead to said mixture ($FH_{CH2F}^{NEUTRAL}$).

According to certain preferred embodiments, Step (II) of the method of the invention causes thermolysis of substantially all chain ends of polymer mixture ($FH_{FOR}$) of formula —$CR_H^1R_H^2$—OC(=O)F, with respect to the total amount of said chain ends of formula —$CR_H^1R_H^2$—OC(=O)F, as resulting from Step (I). In other words, this means that characterization techniques used for identifying and quantifying chain ends of polymer mixture ($FH_{CH2F}$) do not enable detecting any significant amount of —$CR_H^1R_H^2$—OC(=O)F groups, or in other terms that their concentration is below the limit of detection of the said characterization techniques, whereas $R_H^1$ and $R_H^2$ have the meaning as detailed above.

According to these preferred embodiments involving complete thermolysis (leading to no detectable amount of —$CR_H^1R_H^2$—OC(=O)F groups), polymer mixture ($FH_{CH2F}$) is preferably a mixture comprising (preferably essentially consisting of) variable amounts of any of compounds of formula:

(a')

F—$CR_H^1R_H^2$-$E_H$-$CR_H^1R_H^2$—O—[$CF_2$—$R_f$—$CF_2O$—$CR_H^1R_H^2$-$E_H$-$CR_H^1R_H^2$—O]$_{n*}$—$CF_2$—$R_f$—$CF_2O$—$CR_H^1R_H^2$-$E_H$-$CR_H^1R_H^2$—F [formula ($FH_{CH2F-CH2F}$)];

(b')

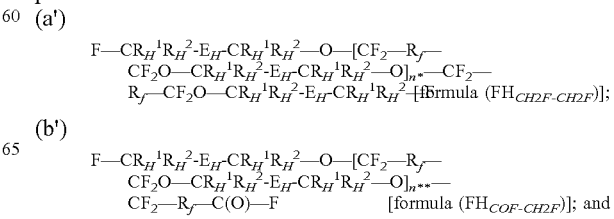

(e')

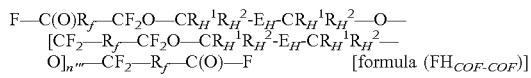

wherein n*, n**, n', n", and n'" are integers such that the molecular weight of the polymer mixture ($FH_{CH2F}$) is of from 210 to 50,000, preferably from 380 to 30,000, more preferably from 450 to 8,000, and even more preferably from 500 to 3,000, and wherein $E_H$, $R_f$, $R_H^1$ and $R_H^2$ have the meaning as detailed above.

According to certain embodiments of the present invention, the method as above detailed comprises an additional step (III) including contacting polymer mixture ($FH_{CH2F}$) with a source of fluorine enabling at least partial fluorination of said polymer mixture ($FH_{CH2F}$), so as to obtain a fluorinated polymer mixture ($FF_{CF3}$).

Advantageously, through fluorination of polymer mixture ($FH_{CH2F}$), at least a fraction of hydrogen atoms of moieties —$CR_H^1R_H^2$-$E_H$-$CR_H^1R_H^2$— (with $E_H$, $R_H^1$ and $R_H^2$ having the meaning indicated above), derived from compound (H), as above detailed, are replaced by fluorine atoms. According to preferred embodiments, substantially all hydrogen atoms of said moieties are replaced in Step (III) with fluorine atoms, so that said moieties —$CR_H^1R_H^2$-$E_H$-$CR_H^1R_H^2$— are transformed into groups of formula —$CR_F^1R_F^2$-$E_F$-$CR_F^1R_F^2$—, wherein:

$E_F$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom, and each of $R_F^1$ and $R_F^2$, equal to or different from each other, is independently F or a $C_1$-$C_6$ fluorocarbon group, preferably F or a $C_1$-$C_3$ perfluoroalkyl group, more preferably F or —$CF_3$, most preferably F.

Preferably, the source of fluorine in Step (III) is a gas containing molecular fluorine. More preferably, said source of fluorine is fluorine gas ($F_2$).

Advantageously, the source of fluorine in step (III) is used in admixture with a diluting gas, preferably selected from inert gas, such as helium and nitrogen.

Advantageously, in Step (III), a halogenated olefin may be contacted with polymer mixture ($FH_{CH2F}$) and fluorine source, in order to advantageously generate fluorine radicals promoting fluorination of polymer mixture ($FH_{CH2F}$). Said halogenated olefin can be selected for example from tetrafluoroethylene (TFE), hexafluoro-propylene (HFP), octafluorobutene, perfluoropentene, perfluorohexene, perfluoroheptene, perfluorooctene, perfluorocyclobutene, perfluorocyclopentene, perfluorocyclohexene, chlorotrifluoroethylene (CTFE), dichlorodifluoroethylene, chloropentafluoropropene, perfluorobutadiene, perfluoromethylvinylether, perfluoro-ethylvinylether, perfluoro-propylvinylether; $CF_3OCIC=CCIF$, trichloroethylene, tetrachloroethylene, dichloroethylene isomers; and fluorodioxoles.

In embodiments wherein fluorination leads to substitution of substantially all hydrogen atoms in polymer mixture ($FH_{CH2F}$), after step (III), the backbone of polymer chains of said polymer mixture ($FF_{CF3}$) consists essentially of a sequence of recurring units of formula ($FF_{unit}$):

$$—[CF_2—R_f—CF_2O—CR_F^1R_F^2-E_F-CR_F^1R_F^2—O]—\qquad (FF_{unit})$$

wherein $R_f$ has the same meanings defined above for compound (F), $E_F$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom, and each of $R_F^1$ and $R_F^2$, equal to or different from each other, is independently F or a $C_1$-$C_6$ fluorocarbon group, preferably F or a $C_1$-$C_3$ perfluoroalkyl group, more preferably F or —$CF_3$, most preferably F.

According to a first variant, the Step (III) of fluorination is carried out on polymer mixture ($FH_{CH2F}$) as obtained from Step (II), possibly after standard separation/purification steps.

According to this first variant of Step (III), generally, end chains of polymer compounds of polymer mixture ($FH_{CH2F}$) either of formula —C(O)—F or of formula —O(CO)—F will not be affected by fluorination in Step (III); rather C—H bonds will be substantially replaced, both in the polymer chains and in end groups of formula —$CR_H^1R_H^2$F, which will be transformed into —$CR_F^1R_F^2$F groups, with $R_H^1$, $R_H^2$, $R_F^1$, and $R_F^2$ having the meaning as detailed above.

During any work-up of polymer mixture ($FH_{CH2F}$), it is generally preferred to avoid exposing compounds of that mixture wherein one or both chain ends are acyl fluoride —C(O)—F group(s) to conditions where hydrolysis may take place.

Indeed, under hydrolysis conditions, said —C(O)F groups may give rise to corresponding carboxylic acid groups —COOH, which may not be stable under fluorinating conditions of Step (III).

More specifically, compounds:

(b)

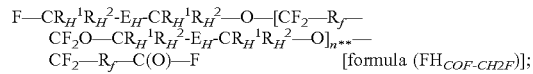

(e)

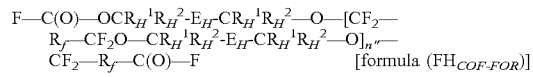

(f)

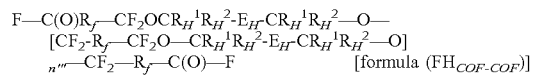

may undergo, during work-up of Step (II), in case said work-up expose the mixture to moisture, to partial (or even total) conversion to corresponding hydrolysed acid derivatives listed below:

($b^{hydr}$)

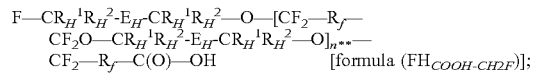

($e^{hydr}$)

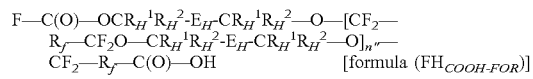

($f^{hydr}$)

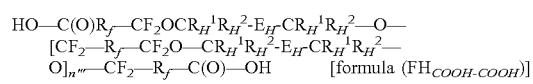

wherein n**, n", and n'" are integers such that the molecular weight of the polymer mixture ($FH_{CH2F}$) is within the above recited boundaries, and wherein $R_f$, $E_H$, $R_H^1$ and $R_H^2$ are as above detailed.

During fluorination, terminal carboxylic group bound to a fluorinated carbon of the moiety $R_f$ may decarboxylate, liberating $CO_2$ and HF, thus leading to additional "non-functional" end-groups.

In particular, hydrolysed acid derivatives listed below:

($b^{hydr}$)

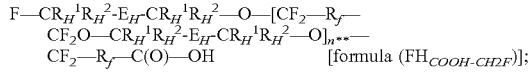
[formula (FH$_{COOH-CH2F}$)];

($e^{hydr}$)

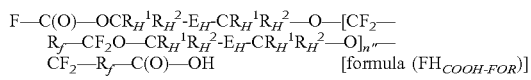
[formula (FH$_{COOH-FOR}$)]

($f^{hydr}$)

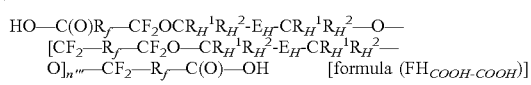
[formula (FH$_{COOH-COOH}$)]

wherein n**, n''', and n'''' are integers such that the molecular weight of the polymer mixture (FH$_{CH2F}$) is within the above recited boundaries, and wherein $R_f$, $E_H$, $R_H^1$ and $R_H^2$ are as above detailed, may undergo, during fluorination Step (III), to partial (or even total) decarboxylation to corresponding fluorinated neutral derivatives listed below:

($b''^{decarb}$)

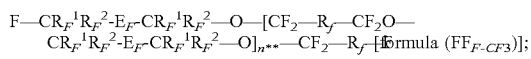
[formula (FF$_{F-CF3}$)];

($e''^{decarb}$)

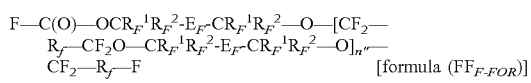
[formula (FF$_{F-FOR}$)]

($f''^{decarb}$)

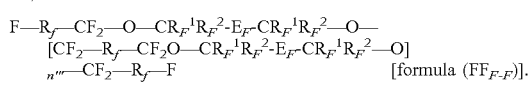
[formula (FF$_{F-F}$)].

According to first variant of Step (III), polymer mixture (FF$_{CF3}$) is generally a mixture comprising (preferably essentially consisting of) variable amounts of any of compounds of formula:

(a'')

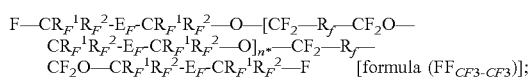
[formula (FF$_{CF3-CF3}$)];

(b'')

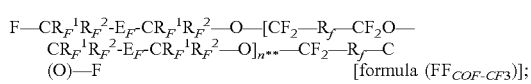
[formula (FF$_{COF-CF3}$)];

(c'')

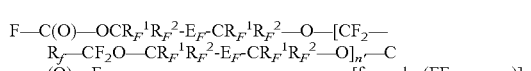
[formula (FF$_{FOR-FOR}$)];

(d'')

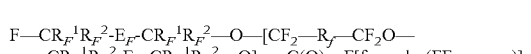
[formula (FF$_{CF3-FOR}$)];

(e'')

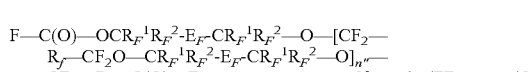
[formula (FF$_{COF-FOR}$)]

(f'')

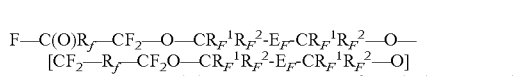
[formula (FF$_{COF-COF}$)];

and optionally further comprising one or more of the following compounds:

($b''^{decarb}$)

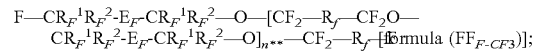
[formula (FF$_{F-CF3}$)];

($e''^{decarb}$)

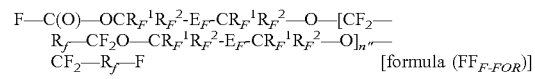
[formula (FF$_{F-FOR}$)]

($f''^{decarb}$)

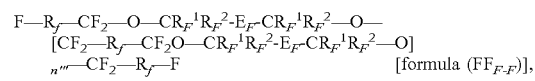
[formula (FF$_{F-F}$)], wherein n*, n**, n', n'', and n''' are integers such that the molecular weight of the polymer mixture (FF$_{CF3}$) is of from 210 to 50,000, preferably from 380 to 30,000, more preferably from 450 to 8,000, and even more preferably from 500 to 3,000, and wherein $R_f$, $E_F$, $R_F^1$, and $R_F^2$ are as above detailed.

According to first variant of Step (III), in embodiments wherein thermolysis in Step (II) is drawn to completion, so that no residual fluoroformate group is present, polymer mixture (FF$_{CF3}$) is preferably a mixture comprising (preferably essentially consisting of) variable amounts of any of compounds of formula:

($a^{IV}$)

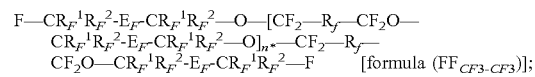
[formula (FF$_{CF3-CF3}$)];

($b^{IV}$)

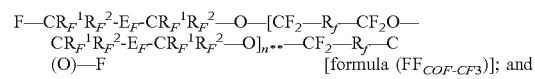
[formula (FF$_{COF-CF3}$)]; and ($f^{IV}$)

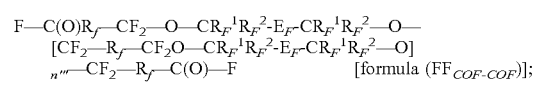
[formula (FF$_{COF-COF}$)];

and optionally:

($b''^{decarb}$)

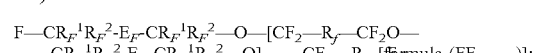
[formula (FF$_{F-CF3}$)];

($f''^{decarb}$)

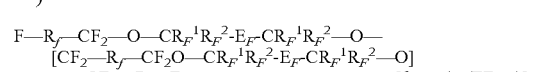
[formula (FF$_{F-F}$)], wherein n*, n**, and n''' are integers such that the molecular weight of the polymer mixture (FF$_{CF3}$) is of from 210 to 50,000, preferably from 380 to 30,000, more preferably from 450 to 8,000, and even more preferably from 500 to 3,000, and wherein $R_f$, $E_F$, $R_F^1$, and $R_F^2$ are as above detailed.

According to first variant of Step (III), according to certain preferred embodiments, the method of the invention can be adjusted to provide a polymer mixture (FF$_{CF3}$) comprising an amount of compounds F—CR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n^{}}$—CF$_2$—R$_f$—C(O)—F, of formula (FF$_{COF-CF3}$), as above detailed (with n being such that the molecular weight of compounds is from 210 to 50,000, preferably from 380 to 30,000, more preferably from 450 to 8,000, and even more preferably from 500 to 3,000, and wherein $R_f$, $E_F$, $R_F^1$, and $R_F^2$ are as above detailed) of at least 60% moles, preferably of at least 70% moles, more preferably at least 80% moles, with respect to the total moles of compounds of formula (FF$_{CF3\text{-}CF3}$), formula (FF$_{COF\text{-}CF3}$), formula (FF$_{FOR\text{-}FOR}$), formula (FF$_{COF\text{-}FOR}$), and formula (FF$_{COF\text{-}COF}$), as above detailed. We'll refer to this mixture as polymer mixture (FF$_{CF3}^{MONO}$).

According to first variant of Step (III), mixture (FF$_{CF3}^{MONO}$) can be obtained from polymer mixture (FH$_{CH2F}^{MONO}$) as above detailed through fluorination in Step (III) as above detailed, under appropriate conditions, so as to advantageously ensure extensive/exhaustive fluorination and replacement of substantially all C—H bonds with C—F bonds.

According to first variant of Step (III), but according to other embodiments, the method of the invention can be adjusted to provide a polymer mixture (FF$_{CF3}$) comprising an amount of compounds F—CR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n^*}$—CF$_2$—R$_f$—CF$_2$O—CR$_F^1$R$_F^2$-E$_F$-CR$_F^1$R$_F^2$—F, of formula (FF$_{CF3\text{-}CF3}$), as above detailed (with n* being such that the molecular weight of the compounds is from 210 to 50,000, preferably from 380 to 30,000, more preferably from 450 to 8,000, and even more preferably from 500 to 3,000, and wherein R$_f$, E$_F$, R$_F^1$, and R$_F^2$ are as above detailed), of at least 60% moles, preferably of at least 70% moles, more preferably at least 80% moles, with respect to the total moles of compounds of formula (FF$_{CF3\text{-}CF3}$), formula (FF$_{COF\text{-}CF3}$), formula (FF$_{FOR\text{-}FOR}$), formula (FF$_{COF\text{-}FOR}$), and formula (FF$_{COF\text{-}COF}$), as above detailed. We'll refer to this mixture as polymer mixture (FF$_{CF3}^{NEUTRAL}$)

According to first variant of Step (III), to lead to the polymer mixture (FF$_{CF3}^{NEUTRAL}$) a mixture (FH$_{CH2F}^{NEUTRAL}$), as above detailed, is submitted in Step (III) to fluorination conditions so as to ensure extensive/exhaustive fluorination and replacement of substantially all C—H bonds with C—F bonds.

According to a second variant, before carrying out Step (III) of fluorination, polymer mixture (FH$_{CH2F}$) as obtained from Step (II) is submitted to at least one Step (III$^4$) of derivatization, modifying the chemical nature of acyl fluoride and/or fluoroformate end groups, to yield polymer mixture (FH$_{CH2F\text{-}derivative}$). It is generally understood that end groups of polymer mixture (FH$_{CH2F\text{-}derivative}$) will be made more stable notably against hydrolysis and decarboxylation over corresponding acyl fluoride and/or fluoroformate groups, originally comprised in polymer mixture (FH$_{CH2F}$) as obtained from Step (II).

In particular, in this second variant, according to certain embodiments, in Step (III$^4$), polymer mixture (FH$_{CH2F}$) may be reacted under esterification conditions in the presence of an alcohol of formula R$_h$OH, with R$_h$ being a C$_1$-C$_3$ hydrocarbon group, e.g. CH$_3$, C$_2$H$_5$, C$_3$H$_7$, preferably C$_2$H$_5$; to provide for polymer mixture (FH$_{CH2F\text{-}ester/carbonate}$), said polymer mixture (FH$_{CH2F\text{-}ester/carbonate}$) being generally a mixture comprising (preferably essentially consisting of) variable amounts of any of compounds of formula:

(a^)

F—CR$_H^1$R$_H^2$-E$_H$-CR$_H^1$R$_H^2$—O—[CF$_2$—R$_f$—CF$_2$O—CR$_H^1$R$_H^2$-E$_H$-CR$_H^1$R$_H^2$—O]$_{n^*}$—C$_F^2$—R$_f$—CF$_2$O—CR$_H^1$R$_H^2$-E$_H$-CR$_H^1$R$_H^2$—[formula (FH$_{CH2F\text{-}CH2F}$)];

(b^)

F—CR$_H^1$R$_H^2$-E$_H$-CR$_H^1$R$_H^2$—O—[CF$_2$—R$_f$—CF$_2$O—CR$_H^1$R$_H^2$-E$_H$-CR$_H^1$R$_H^2$—O]$_{n^{**}}$—CF$_2$—R$_f$—C(O)—O—R$_h$ [formula (FH$_{ester\text{-}CH2F}$)];

(c^)

R$_h$O—C(O)—OCR$_H^1$R$_H^2$-E$_H$-CR$_H^1$R$_H^2$—O—[CF$_2$—R$_f$—CF$_2$O—CR$_H^1$R$_H^2$-E$_H$-CR$_H^1$R$_H^2$—O]$_{n'}$—C(O)—O—R$_h$ [formula (FH$_{carbonate\text{-}carbonate}$)];

(d^)

F—CR$_H^1$R$_H^2$-E$_H$-CR$_H^1$R$_H^2$—O—[CF$_2$—R$_f$—CF$_2$O—CR$_H^1$R$_H^2$-E$_H$-CR$_H^1$R$_H^2$—O]$_{n'}$—C(O)—O—R$_h$ [formula (FH$_{CH2F\text{-}carbonate}$)];

(e^)

R$_h$O—C(O)—OCR$_H^1$R$_H^2$-E$_H$-CR$_H^1$R$_H^2$—O—[CF$_2$—R$_f$—CF$_2$O—CR$_H^1$R$_H^2$-E$_H$-CR$_H^1$R$_H^2$—O]$_{n'''}$—CF$_2$—R$_f$—C(O)—OR$_h$ [formula (FH$_{ester\text{-}carbonate}$)]

(f^)

R$_h$O—C(O)R$_f$—CF$_2$OCR$_H^1$R$_H^2$-E$_H$-CR$_H^1$R$_H^2$—O—[CF$_2$—R$_f$—CF$_2$O—CR$_H^1$R$_H^2$-E$_H$-CR$_H^1$R$_H^2$—O]$_{n'''}$—CF$_2$—R$_f$—C(O)—OR$_h$ [formula (FH$_{ester\text{-}ester}$)]

wherein n*, n**, n', n'', and n''' are integers such that the molecular weight of the polymer mixture (FH$_{CH2F\text{-}ester\text{-}carbonate}$) is from 210 to 50,000, preferably from 380 to 30,000, more preferably from 450 to 8,000, and even more preferably from 500 to 3,000, and wherein R$_f$, E$_H$, R$_h$, R$_H^1$ and R$_H^2$ are as above detailed.

This step of esterification of polymer mixture (FH$_{CH2F}$) is notably effective in substantially avoiding the presence of derivatives possessing COOH end groups, which may undergo decarboxylation under fluorination Step (III).

According to this second variant, the fluorination Step (III) as above detailed leads to a polymer mixture (FF$_{CF3\text{-}ester\text{-}carbonate}$) comprising (preferably essentially consisting of) variable amounts of any of compounds of formula:

(a^f)

F—CR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n^*}$—CF$_2$—R$_f$—CF$_2$O—CR$_F^1$R$_F^2$-E$_F$-CR$_F^1$R$_F^2$—F [formula (FF$_{CF3\text{-}CF3}$)];

(b^f)

F—CR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n^{**}}$—CF$_2$—R$_f$—C(O)—OR$_{hF}$ [formula (FF$_{ester\text{-}CF3}$)];

(c^f)

R$_{hF}$—O(O)—OCR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n'}$—C(O)—OR$_{hF}$ [formula (FF$_{carbonate\text{-}carbonate}$)];

(d^f)

F—CR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n'}$—C(O)—OR$_{hF}$ [formula (FF$_{CF3\text{-}carbonate}$)];

(e^f)

R$_{hF}$O—C(O)—OCR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n''}$—CF$_2$—R$_f$—C(O)—OR$_{hF}$ [formula (FF$_{ester\text{-}carbonate}$)]

(f^f)

R$_{hF}$O—C(O)R$_f$—CF$_2$—O—CR$_F^1$R$_F^2$-E$_F$-CR$_F^1$R$_F^2$—O—[CF$_2$—R$_f$—CF$_2$O—CR$_F^1$R$_F^2$-E$_F$-CR$_F^1$R$_F^2$—O]$_{n'''}$—CF$_2$—R$_f$—C(O)—OR$_{hF}$ [formula (FF$_{ester\text{-}ester}$)]

wherein n*, n**, n', n'', and n''' are integers such that the molecular weight of the polymer mixture (FF$_{CF3}$) is of from 210 to 50,000, preferably from 380 to 30,000, more preferably from 450 to 8,000, and even more preferably from 500 to 3,000, and wherein R$_f$, E$_F$, R$_F^1$, and R$_F^2$ are as above detailed, and R$_{hF}$ being a C$_1$-C$_3$ fluorocarbon group, e.g. CF$_3$, C$_2$F$_5$, C$_3$F$_7$, preferably C$_2$F$_5$.

Polymer mixtures ($FH_{CH2F}$), ($FH_{CH2F\text{-}ester\text{-}carbonate}$), ($FF_{CF3\text{-}ester\text{-}carbonate}$) and ($FF_{CF3}$) can be used as such, or can be further modified using:

(i) reactivity of —C(O)F [be those —C(O)—F groups as in mixture ($FH_{CH2F}$) and as in mixture ($FF_{CF3}$); or as esters as in mixture ($FH_{CH2F\text{-}ester\text{-}carbonate}$) and in mixture ($FF_{CF3\text{-}ester\text{-}carbonate}$)] and/or (ii) reactivity of —O—C(O)—F groups [be those —O—C(O)—F groups present as —$CR_H^1R_H^2$—OC(O)—F groups as in mixture ($FH_{CH2F}$); as carbonates as in mixture ($FH_{CH2F\text{-}ester\text{-}carbonate}$) and in mixture ($FF_{CF3\text{-}ester\text{-}carbonate}$); or as —$CR_F^1R_F^2$—OC(O)—F groups as in mixture ($FF_{CF3}$)] to create different chain ends and/or can be submitted to a variety of additional separation steps, so as to possibly isolate specific components thereof in high yields.

Whichever type of chemistry may be applied to those groups; in particular, —C(O)F groups may be submitted to hydrolysis/esterification reactions, leading to carboxyl-type end groups, including carboxylic acid, ester, amide, acyl halide other than fluoride groups, or may be reacted with different reactants starting from said acyl/carboxyl-type end groups, e.g. as described in U.S. Pat. No. 3,810,874 (MINNESOTA MINING AND MANUFACTURING COMPANY) May 14, 1974.

Hence, for instance, compound F—$CH_2$-$E_H$-$CH_2$—O—[$CF_2$—$R_f$—$CF_2O$—$CH_2$-$E_H$-$CH_2$—O]$_{n}$—$CF_2$—$R_f$—C(O)—F of formula ($FH_{COF\text{-}CH2F}$) of polymer mixture ($FH_{CH2F}$) can be modified into a compound of formula F—$CH_2$-$E_H$-$CH_2$—O—[$CF_2$—$R_f$—$CF_2O$—$CH_2$-$E_H$-$CH_2$—O]$_{n}$—$CF_2$—$R_f$-A of formula ($FH_{A\text{-}CH2F}$), wherein $n**$, $E_H$ and $R_f$ have the meanings defined above, and A is a group of formula —$X_aYZ_b$, wherein:

X a polyvalent, preferably divalent, linking organic radical, preferably selected from the group consisting of —CONR—, —COO—, —COS—, —CO—, and groups of any of formulae:

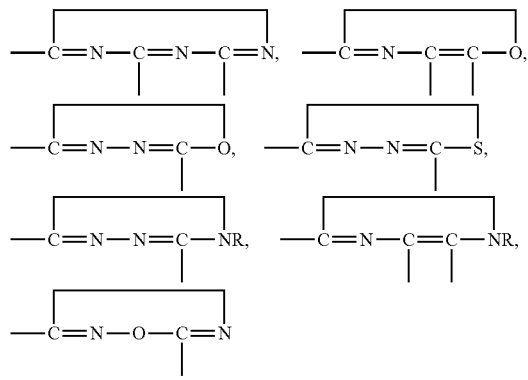

a is zero or one;
b is an integer of 1-3;
R is hydrogen, (e.g., $CH_3$, —$CH_2CF_3$, —$C_6H_{13}$), aryl of less than 13 carbon atoms (e.g., —$C_6H_5$, —$C_6H_4CH_3$) or —$YZ_b$ radical;
Y is a bond or a polyvalent linking organic radicals free of olefinic unsaturation such as alkylene (e.g., —$CH_2$—, —$C_2H_4$—), oxa-alkylene (e.g., —$CH_2OCH_2$—), cycloalkylene (e.g. -c-$C_6H_{10}$—), thia-alkylene (e.g., —$CH_2SCH_2$—), arylene (e.g. —$C_6H_4$—), or combinations thereof, such as aralkylene and alkarylene;

Z is a functional groups which may notably undergo electrophilic, nucleophilic, or free radical reaction, and which can be notably selected from the group consisting of —OH, —SH, —SR', —$NR_2'$, —$CO_2H$, —$SiR'_dQ_{3-d}$, —CN, —NCO, >C=C<, —$CO_2R'$, —$OSO_2CF_3$, —OCOCl, —OCN, —N(R')CN, —(O)COC(O)—, —N=C, —I, —CHO, —$CH(OCH_3)_2$, —$SO_2Cl$, —$C(OCH_3)$=NH, —$C(NH_2)$=NH, —$C_6H_4OC_6H_4$-Q, —$OCR_1R_2R_f$,

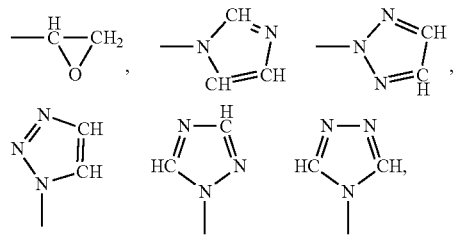

wherein R' is hydrogen, aryl, or a $C_1$-$C_6$ alkyl; Q is halogen, —OR', —OCOR', or —CH=$CH_2$; and d is or an integer of 1 to 3; $R_1$ is hydrogen, or a $C_1$-$C_6$ (fluoro)alkyl, $R_2$ is hydrogen, or a $C_1$-$C_6$ alkyl; and $R_f$ is a $C_1$-$C_6$ (fluoro)alkyl.

Similarly, compound $F_3C$-$E_F$-$CF_2$—O—[$CF_2$—$R_f$—$CF_2O$—$CF_2$-$E_F$-$CF_2$—O]$_{n}$—$CF_2$—$R_f$—C(O)—F, of formula ($FF_{COF\text{-}CF3}$), as above detailed, of polymer mixture ($FF_{CF3}$) can be modified into a compound of formula $F_3C$-$E_F$-$CF_2$—O—[$CF_2$—$R_f$—$CF_2O$—$CF_2$-$E_F$-$CF_2$—O]$_{n}$—$CF_2$—$R_f$-A, with $E_F$, $n**$, $R_f$ and A as above detailed.

Similarly, whichever type of chemistry may be applied to —O—C(O)F groups. In particular, the said —$CH_2$—OC(O)—F and —$CF_2$—OC(O)—F groups may undergo hydrolysis/esterification reactions, leading, respectively to —$CH_2$—OC(O)—OR* groups, with R* being a (halo)hydrocarbon group; or —C(O)—R* with R* being a (halo)hydrocarbon group; acid/esters or carbonate acid/ester groups may be further reacted with different reactants starting from said acyl/carboxyl-type end groups, e.g. as described notably in U.S. Pat. No. 3,810,874 (MINNESOTA MINING AND MANUFACTURING COMPANY) May 14, 1974, and as detailed above.

Polymer mixtures ($FH_{CH2F}$), ($FH_{CH2F\text{-}ester\text{-}carbonate}$), ($FF_{CF3\text{-}ester\text{-}carbonate}$) and ($FF_{CF3}$), either as such, or further modified, notably as above detailed, can be used for the manufacture of additives for plastic and glass coating.

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

EXPERIMENTAL SECTION

Methods

The average number molecular weight (Mn) was determined by NMR analysis ($^{19}$F-NMR and $^1$H-NMR).

Materials

Dry CsF powder (title 99.9%) was obtained from Aldrich Co.

Example 1

Monofunctional Poly-$C_3$ Structure

Step (a): Polycondensation Reaction to Provide Polymer Mixture ($FH_{FOR}$-1)

In a Parr autoclave (600 ml) equipped with a mechanical stirrer and a pressure transducer, dry CsF powder (52.27 g, 0.34 mol.), the fluoroformate $F(O)C$—$O(CH_2)_3O$—$C(O)F$ (115.68 g, 0.69 mol.) and anhydrous tetraethylene glycol dimethyl ether (150 g) were charged in a dry-box under nitrogen atmosphere. After removing the incondensable gases by vacuum at $10^{-5}$ mbar at $-196°$ C., the perfluoromalonyl fluoride $FC(O)$—$CF_2$—$C(O)F$ (99.10 g, 0.69 mol) was condensed in the autoclave at liquid nitrogen temperature. The reaction mixture was heated at 120° C. by a heating mantle and kept under mechanical stirring at this temperature for 8 hours. The pressure increase in this time, due to the $CO_2$ formation, was monitored. After the reaction was finished, the autoclave was cooled down to room temperature and the gaseous products ($CO_2$, HF) were eliminated and bubbled into a solution of NaOH at 10% (600 cc). The fluorinated phase inside the autoclave was recovered and the reaction mixture filtered under pressure over a PTFE filter (0.45 mm) to remove most of the CsF catalyst. The $^1$H-NMR and $^{19}$F-NMR analyses of the crude mixture showed the formation of the partially fluorinated-polyether polymer comprising terminal groups —$CF_2C(O)F$ (38% mol.), —$CH_2$—$C(O)F$ (55% mol.) and —$CH_2F$ (7% mol.), the presence of these groups indicating a very partial thermolysis of certain —$CH_2$—$OC(O)F$ groups.

Step (b): Thermolysis to Provide Polymer Mixture ($FH_{CH2F}$-1)

The obtained product was poured in a glass flask equipped with a Claisen water condenser and heated in the range from 140 to 200° C. in 8 hours under nitrogen atmosphere in the presence of the remaining CsF to transform the fluoroformate groups into neutral groups —$CH_2F$ and purified simultaneously by fractional distillation to remove the solvent and the by-products.

At the end of the heating step, 92.0 g of the final polymer mixture ($FH_{CH2F}$-1) were obtained, comprising a majority of monofunctional derivative having a —COF and a —$CH_2F$ end group, and having average number molecular weight (MW) equal to 1300 and containing an averaged amount of groups —COF of 44% mol. and of groups —$CH_2F$ of 56% mol., as determined by $^1$H-NMR and $^{19}$F-NMR analyses.

Step (c): Perfluorination Reaction to Provide Polymer Mixture ($FF_{CF3}$-1), Followed by Hydrolysis with Ethanol 25.0 g of the polymer mixture obtained in step (b) were diluted in 130 g of 1,2,3,4-tetrachlorohexafluorobutane and loaded into a 250 ml stainless steel reactor equipped with a mechanical stirrer, two inlet pipes, a thermocouple and an outlet pipe. While keeping the reactor at 0° C. and under vigorous stirring, elemental fluorine (25% vol/vol in helium) was fed to the reactor and its conversion was monitored by gas chromatography analysis. When fluorine conversion dropped down below 50%, hexafluoropropene (16% vol/vol in helium) was fed to the reactor by the second inlet pipe to achieve the complete conversion of all residual hydrogen atoms (the molar ratio $F_2$:$C_3F_6$ was about 6.5:1).

At the end of the perfluorination, the residual fluorine was vented away by inert gas, the crude mixture was discharged in a PFA round bottom flask and treated with excess ethanol (EtOH) to convert all reactive groups —$CF_2C(O)F$ to —$CF_2C(O)OCH_2CH_3$.

The solution was then washed with water to remove excess EtOH, HF and $CF_3C(O)OCH_2CH_3$ and then the solvent was distilled away obtaining 30.5 g of an oily product whose $^{19}$F and $^1$H-NMR analysis confirmed a structure having group —$CF_2CF_2CF_2O$— as repeating unit in the backbone, $CF_3CF_2CF_2O$— (56% mol) and —$CF_2CF_2C(O)OCH_2CH_3$ (44% mol) as terminal groups and average MW=1750.

Example 2

Monofunctional Poly-$C_3$ Structure

Step (a): Polycondensation Reaction to Provide Polymer Mixture ($FH_{FOR}$-2)

Following the experimental procedure of step (a) of Example 1, dry CsF in powder (53.37 g, 0.35 mol.), the fluoroformate $F(O)C$—$O(CH_2)_3O$—$C(O)F$ (118.12 g, 0.70 mol.) and anhydrous tetraethylene glycol dimethyl ether (150 g) were charged. Then, perfluoromalonyl fluoride $FC(O)$—$CF_2$—$C(O)F$ (101.19 g, 0.70 mol.) was condensed and maintained for 48 hours at 120° C.

Step (b): Thermolysis to Provide Polymer Mixture ($FH_{CH2F}$-2) and Subsequent Hydrolysis At the end of Step (a), the crude mixture was filtered, poured in a glass and heated from 140 to 200° C. for 8 hours in the presence of the remaining CsF to transform the fluoroformate groups into groups —$CH_2F$, while purifying by fractional distillation to remove the solvent and the by-products. After the thermal treatment and distillation process, 88.38 g of the final polymer mixture ($FH_{CH2F}$-2) were obtained, comprising a majority of monofunctional derivative having a —COF and a —$CH_2F$ end group, and having a number average MW of 1900 and containing in average groups —COF (42% mol), —OC(O)F (8% mol.) and —$CH_2F$ (50% mol.).

In a PFA 3 neck-round bottom flask (250 ml) equipped with a mechanical stirrer and water condenser, the polymer mixture was charged and 20 ml of anhydrous EtOH were slowly added at 5° C. under nitrogen atmosphere. The reaction mixture was allowed to warm up to room temperature and then heated to 80° C. for 8 hours to convert all the reactive acyl-fluoride and fluoro-formate terminal groups to the corresponding —$CF_2C(O)OCH_2CH_3$ and —$CH_2OC(O)OCH_2CH_3$ groups.

After the reaction was completed, the excess EtOH and HF were removed by distillation to give the final product that was characterized by $^1$H-NMR and $^{19}$F-NMR analyses.

Step (c): Perfluorination Reaction to Provide Polymer Mixture ($FF_{CF3}$-2)

Following the procedure of step (c) in Example 1, 23.0 g of the polymer obtained in step (b) were diluted in 113 g of 1,2,3,4-tetrachlorohexafluoro-butane. At the end of the reaction, the obtained crude mixture was treated with excess EtOH, washed with water and, after distillation of the solvent, 28.2 g of an oily product was obtained whose $^{19}$F and $^1$H-NMR analysis confirmed a structure having group —$CF_2CF_2CF_2O$— as repeating unit in the backbone, $CF_3CF_2CF_2O$— (50% mol.) and —$CF_2CF_2C(O)OCH_2CH_3$ (50% mol.) as terminal groups and an average MW=2150.

Example 3

Monofunctional Poly-$C_3$ Structure

Step (a): Polycondensation Reaction to Provide Polymer Mixture ($FH_{FOR}$-3)

Following the experimental procedure of step (a) of Example 1, dry CsF powder (52.74 g, 0.35 mol.), the fluoroformate F(O)C—O(CH$_2$)$_3$O—C(O)F (116.73 g, 0.69 mol.) and anhydrous tetraethylene glycol dimethyl ether (150 g) were charged. Then, the perfluoromalonyl fluoride FC(O)—CF$_2$—C(O)F (100.0 g, 0.69 mol.) was condensed in the autoclave and maintained for 16 hours at 120° C. to provide for a crude mixture ($FH_{FOR}$-3).

Step (b): Thermolysis to Provide Polymer Mixture ($FH_{CH2F}$-3) and Subsequent Hydrolysis The crude mixture from Step (a) was filtered, heated at 190° C. for 8 hours in the presence of the remained CsF and fractional distilled at a temperature of from 140 to 190° C. to give 84.86 g of the final polymer mixture ($FH_{FOR}$), comprising a major amount of monofunctional derivative having a —COF group and a —CH$_2$F group, and having number average MW=1200 and containing, in average, groups —COF (52% mol.) and —CH$_2$F (48% mol.). This HFPE polymer was esterified with EtOH following the same procedure described in Example 2 above.

Step (c): Perfluorination Reaction to Provide Polymer Mixture ($FF_{CF3}$-3)

Following the procedure described in step (c) of Example 1, 21.0 g of the polymer obtained in step (b) of Example 3 were diluted in 130 g of 1, 2, 3, 4-tetrachlorohexafluorobutane. At the end of the reaction, the obtained crude mixture was treated with excess of EtOH, washed with water and, after distillation of the solvent, 25.5 g of an oily product were obtained, whose $^{19}$F and $^1$H-NMR analysis confirmed a structure having —CF$_2$CF$_2$CF$_2$O— as repeating unit in the backbone, CF$_3$CF$_2$CF$_2$O— (51% mol.) and —CF$_2$CF$_2$C(O)OCH$_2$CH$_3$ (49% mol.) as terminal groups and an average MW=1350.

Example 4

Monofunctional PFPE Poly $C_3$-$C_4$ Structure

Step (a): Polycondensation Reaction to Provide Polymer Mixture ($FH_{FOR}$-4)

Following the experimental procedure of step (a) of Example 1, dry CsF (42.19 g, 0.28 mol.), the fluoroformate F(O)C—O(CH$_2$)$_4$O—C(O)F (105.0 g, 0.58 mol.) and anhydrous tetraethylene glycol dimethyl ether (160 g) were charged. Then, the perfluoromalonyl fluoride FC(O)—CF$_2$—C(O)F (90.00 g, 0.63 mol.) was condensed in the autoclave, and maintained during 24 hours at 120° C., so as to obtain a crude mixture ($FH_{FOR}$-4).

Step (b): Thermolysis to Provide Polymer Mixture ($FH_{CH2F}$-4) and Subsequent Hydrolysis The crude mixture from Step (a) was filtered, heated at a temperature from 140 to 190° C. for 5 hours in the presence of the remained CsF while distilling, to give 86.1 g of the final polymer mixture ($FH_{CH2F}$-4), having a number average MW=1700 and containing groups —COF (25% mol), —OC(O)F (14% mol.) and —CH$_2$F (61% mol.) as determined by $^1$H-NMR and $^{19}$F-NMR analyses.

Step (c): Perfluorination Reaction to Provide Polymer Mixture ($FF_{CF3}$-4)

Following the procedure described in step (c) of Example 1, 59.8 g of the polymer obtained in step (a) of Example 4 were diluted in 150 g of 1,2,3,4-tetrachlorohexafluorobutane.

At the end of the reaction, the obtained crude mixture was treated with excess of EtOH to convert all reactive groups —OCF$_2$CF$_2$C(O)F and —OCF$_2$CF$_2$CF$_2$OC(O)F to —OCF$_2$CF$_2$C(O)OCH$_2$CH$_3$ and —OCF$_2$CF$_2$CF$_2$C(O)OCH$_2$CH$_3$ respectively; then, washed with water and, after distillation of the solvent, 84.7 g of an oily product were obtained, whose $^{19}$F and $^1$H-NMR analysis confirmed a structure having —CF$_2$CF$_2$CF$_2$O—CF$_2$CF$_2$CF$_2$O— as repeating unit in the backbone, and CF$_3$CF$_2$CF$_2$CF$_2$O— (61% mol.), —OCF$_2$CF$_2$C(O)OCH$_2$CH$_3$ (18% mol.) and —OCF$_2$CF$_2$CF$_2$C(O)OCH$_2$CH$_3$ (21% mol.) as terminal groups and an average MW=2425.

Example 5

Monofunctional PFPE Poly $C_3$-$C_4$ Structure

Step (a): Polycondensation Reaction to Provide Polymer Mixture ($FH_{FOR}$-5)

In a Parr autoclave (100 ml) dry CsF (6.26 g, 41.21 mmol.), the fluoroformate F(O)C—O(CH$_2$)$_3$O—C(O)F (15.25 g, 90.72 mmol.) and anhydrous tetraethylene glycol dimethyl ether (25 g) were charged in a dry-box under nitrogen atmosphere.

After removing the incondensable gases by vacuum at 10$^{-5}$ mbar at −196° C. using a liquid nitrogen bath, the tetrafluorosuccinoyl fluoride FC(O)—CF$_2$CF$_2$—C(O)F (16.0 g, 82.47 mmol.) was condensed while keeping the autoclave at −78° C. The reaction mixture was warmed up to room temperature and then heated at 120° C. for 50 hours.

Step (b): Thermolysis to Provide Polymer Mixture ($FH_{CH2F}$-5)

After the reaction was completed, the fluorinated phase inside the autoclave was recovered, filtered and heated at a temperature from 140 to 190° C. for 10 h in the presence of the remained CsF, while distilling, to give 17.5 g of the final polymer mixture ($FH_{CH2F}$-5), comprising a major amount of monofunctional derivative having a —COF group and a —CH$_2$F group, having a number average MW=1500 and containing groups —CF$_2$COF (38% mol.) and neutral terminal groups —CH$_2$F (62% mol.).

Example 6

Monofunctional PFPE Poly-$C_3OC_2OC_2$— Structure

Step (a): Polycondensation Reaction to Provide Polymer Mixture ($FH_{FOR}$-6)

Following the experimental procedure of step (a) of Example 1, dry CsF (37.45 g, 0.25 mol.), the fluoroformate F(O)C—OCH$_2$CH$_2$OCH$_2$CH$_2$O—C(O)F (97.63 g, 0.49 mol.) and anhydrous tetraethylene glycol dimethyl ether (110 g) were charged. Then, the perfluoromalonyl fluoride FC(O)—CF$_2$—C(O)F (71.00 g, 0.49 mol.) was condensed in the autoclave. Heating was pursued for 70 hours at 120° C., to complete polycondensation.

Step (b): Thermolysis to Provide Polymer Mixture ($FH_{CH2F}$-6) and Subsequent Hydrolysis The crude mixture was heated in the autoclave at 160° C. for 7 hours in the presence of the catalyst CsF. Then, the fluorinated phase was recovered to give 85.0 g of the desired polymer mixture (FH$_{CH2F}$-6), having a number average MW=800 and containing groups —CF$_2$C(O)F (37% mol.) and —CH$_2$F (63% mol.). This obtained product mixture was esterified with EtOH following the procedure described in Example 2.

Step (c): Perfluorination Reaction to Provide Polymer Mixture (FF$_{CF3}$-6)

Following the procedure described in step (c) of Example 1, 50.8 g of the polymer obtained in step (b) of Example 6 were diluted in 152 g of 1,2,3,4-tetrachlorohexafluorobutane. At the end of the reaction, the crude mixture was treated with excess of EtOH, washed with water and, after distillation of the solvent, 63.5 g of an oily product was obtained, whose $^{19}$F and $^1$H-NMR analysis confirmed a structure having —CF$_2$CF$_2$CF$_2$O—CF$_2$CF$_2$OCF$_2$CF$_2$O— as repeating unit in the backbone, CF$_3$CF$_2$OCF$_2$CF$_2$O— (63% mol.) and —OCF$_2$CF$_2$C(O)OCH$_2$CH$_3$ (37% mol.) as terminal groups and an average MW=1375.

Example 7

Monofunctional PFPE Poly C$_4$ Structure

Step (a): Polycondensation Reaction to Provide Polymer Mixture (FH$_{FOR}$-7)

Following the procedure disclosed in Example 5, dry CsF powder (6.26 g, 41.21 mmol.), the fluoroformate F(O)C—O(CH$_2$)$_4$O—C(O)F (16.51 g, 90.72 mmol.) and anhydrous tetraethylene glycol dimethyl ether (25 g) were charged. Then, the tetrafluorosuccinoyl fluoride FC(O)—CF$_2$CF$_2$—C(O)F (16.0 g, 82.47 mmol.) was condensed in the autoclave. Reaction was pursued for 44 hours at 120° C., to yield a crude mixture (FH$_{FOR}$-7).

Step (b): Thermolysis to Provide Polymer Mixture (FH$_{CH2F}$-7)

The crude mixture from Step (a) was filtered, heated at 190° C. for 8 hours in the presence of the remained CsF and fractional distilled at a temperature from 140 to 190° C. to give 22.1 g of the final polymer mixture, having a number average MW=1300 and containing groups —CF$_2$COF (37% mol.) and —CH$_2$F (63% mol.).

Example 8

Monofunctional PFPE Poly C$_3$-C$_6$ Structure

Step (a): Polycondensation Reaction to Provide Polymer Mixture (FH$_{FOR}$-8)

Following the procedure disclosed in Example 5, dry CsF powder (5.17 g, 34.3 mmol.), the fluoroformate F(O)C—O(CH$_2$)$_3$O—C(O)F (11.43 g, 68.00 mmol.), the octafluoroadipoyl fluoride FC(O)—(CF$_2$)$_4$—C(O)F (20.0 g, 68.00 mmol.) and anhydrous acetonitrile (30.0 g) were charged in the autoclave. Reaction was pursued for 23 hours at 120° C., to provide for a crude mixture (FH$_{FOR}$-8).

Step (b): Thermolysis to Provide Polymer Mixture (FH$_{CH2F}$-8)

The crude mixture was filtered, heated at 180° C. for 30 hours in the presence of the remained CsF and fractional distillated at a temperature from 140 to 190° C. to give 15.3 g of the final mono-functional partially fluorinated polyether polymer (HFPE), that was characterized by $^1$H-NMR and $^{19}$F-NMR analyses with a number average MW=1200 and containing groups —CF$_2$COF (45% mol.) and —CH$_2$F (55% mol.).

Example 9

Monofunctional PFPE Poly C$_4$-C$_6$ Structure

Step (a): polycondensation reaction to provide polymer mixture (FH$_{FOR}$-9)

Following the procedure disclosed in Example 5, dry CsF powder (3.87 g, 25.48 mmol.), the fluoroformate F(O)C—O(CH$_2$)$_4$O—C(O)F (10.21 g, 56.10 mmol.), the octafluoroadipoyl fluoride FC(O)—(CF$_2$)$_4$—C(O)F (15.0 g, 51.00 mmol.) and anhydrous acetonitrile (25.0 g) were charged in the autoclave. Heating was maintained during 45 hours at 120° C. to provide for a polymer mixture (FH$_{FOR}$-9).

Step (b): Thermolysis to Provide Polymer Mixture (FH$_{CH2F}$-8)

The crude mixture from Step (a) was filtered, heated at 180° C. for 30 hours in the presence of the remained CsF and fractional distilled at a temperature from 140 to 190° C. to give 15.0 g of a polymer mixture comprising a major amount of a mono-functional derivative possessing a —CF$_2$COF end group and a —CH$_2$F end group, that was characterized by $^1$H-NMR and $^{19}$F-NMR analyses with a number average MW=1100 and containing groups —CF$_2$COF (34% mol.) and groups —CH$_2$F (66% mol.).

The invention claimed is:

1. A polymer mixture (FH$_{CH2F}$) comprising variable amounts of any of compounds of formula:

(a)

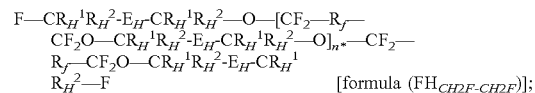

[formula (FH$_{CH2F-CH2F}$)];

(b)

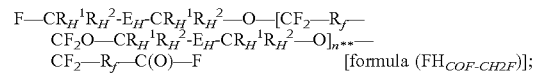

[formula (FH$_{COF-CH2F}$)];

(c)

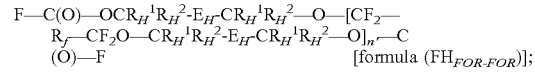

[formula (FH$_{FOR-FOR}$)];

(d)

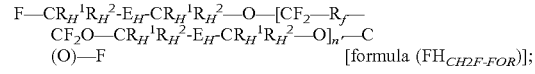

[formula (FH$_{CH2F-FOR}$)];

(e)

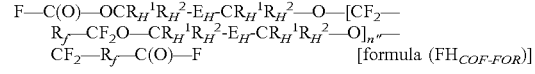

[formula (FH$_{COF-FOR}$)]

(f)

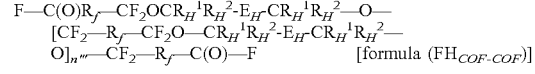

[formula (FH$_{COF-COF}$)]

wherein:
n*, n**, n', n", and n'" are integers such that the molecular weight as measured by NMR analysis of the polymer mixture (FH$_{CH2F}$) is from 210 to 50 000;

wherein the polymer mixture (FH$_{CH2F}$) is synthesized from at least:
at least one perfluoro compound,
wherein the compound (F) is a compound of the formula:

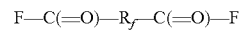

wherein $R_f$ is a divalent, perfluoro linear or branched (oxy)alkylene chain, wherein said alkylene chain comprises from 1 to 10 carbon atoms and is optionally interrupted by one or more oxygen atoms; and wherein compound (F) is selected from the group consisting of:

(F-i) FC(O)—CF$_2$—C(O)F;
(F-ii) FC(O)—CF$_2$—CF$_2$—C(O)F;
(F-iii) FC(O)—CF$_2$—CF$_2$—CF$_2$—C(O)F;
(F-iv) FC(O)—CF$_2$—CF$_2$—CF$_2$—CF$_2$—C(O)F; and
(F-v) FC(O)—CF$_2$—O—CF$_2$—C(O)F; and at least one hydrogenated compound,
wherein the polymer mixture (FH$_{CH2F}$) comprises a partially fluorinated polyether backbone having two chain ends, wherein said backbone comprises recurring unit(s) derived from said at least one compound (F) alternately arranged with recurring unit(s) derived from said at least one compound (H), wherein $E_H$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;

each of $R_H^1$ and $R_H^2$, equal to or different from each other at each occurrence, is independently H or a $C_1$-$C_6$ hydrocarbon group; and wherein in polymer mixture (FH$_{CH2F}$):
the concentration of compound of formula (FH$_{CH2F\text{-}CH2F}$), is higher than the concentration of compound of formula (FH$_{FOR\text{-}FOR}$); and/or
the concentration of compound of formula (FH$_{COF\text{-}CH2F}$), is higher than the concentration of compound of formula (FH$_{COF\text{-}FOR}$).

2. A method for the synthesis of the mixture of polymers of claim 1 comprising a partially fluorinated polyether backbone having two chain ends, each of said chain ends being linked to an opposite side of said backbone, wherein each of the first chain end and the second chain end is independently selected from the group consisting of —CR$_H^1$R$_H^2$—OC(=O)F, —C(=O)F, and —CR$_H^1$R$_H^2$F, with R$_H^1$ and R$_H^2$, equal to or different from each other, are each independently H or a $C_1$-$C_6$ hydrocarbon group;

said process comprising:
Step (I): a step of contacting:
at least one perfluoro compound comprising at least two acyl-fluoride groups; and
at least one hydrogenated compound comprising at least two fluoroformate groups of formula —CR$_H^1$R$_H^2$—O—C(O)F,
in the presence of at least one fluoride-containing compound,
to provide a mixtures of polymers comprising a partially fluorinated polyether backbone having two chain ends, wherein said backbone comprises recurring unit(s) derived from said at least one compound (F) alternately arranged with recurring unit(s) derived from said at least one compound (H), and
wherein each of said chain ends, equal to or different from each other, is selected from the group consisting of a group —CR$_H^1$R$_H^2$—OC(=O)F and a group —C(=O)F;

Step (II): a step of heating said polymer (FH$_{FOR}$) obtained in step (I) above at a temperature exceeding 120° C. for a duration of at least 4 hours and in the presence of a fluoride-containing compound, optionally in the presence of a fluoride-containing compound comprising at least one of (i) a metal fluoride of formula MeF$_y$, with Me being a metal having y valence, y being 1 or 2; and (ii) an (alkyl)ammonium fluoride of formula NR$^{HN}_4$F, with each of R$^{HN}$, equal to or different from each other being, independently, a H or an alkyl group, in particular tetrabutylammonium fluoride, wherein the heating converts at least a fraction of the chain ends of polymer (FH$_{FOR}$) of formula —CR$_H^1$R$_H^2$—OC(=O)F to groups —CR$_H^1$R$_H^2$—F,
to provide the polymer mixture (FH$_{CH2F}$).

3. The method (P$_{FH}$) of claim 2, wherein:
said compound (F) is a compound of formula:

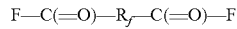

wherein $R_f$ is a divalent, perfluoro linear or branched (oxy)alkylene chain, wherein said alkylene chain comprises from 1 to 10 carbon atoms and is optionally interrupted by one or more oxygen atoms; and wherein compound (F) is selected from the group consisting of:

(F-i) FC(O)—CF$_2$—C(O)F;
(F-ii) FC(O)—CF$_2$—CF$_2$—C(O)F;
(F-iii) FC(O)—CF$_2$—CF$_2$—CF$_2$—C(O)F;
(F-iv) FC(O)—CF$_2$—CF$_2$—CF$_2$—CF$_2$—C(O)F; and
(F-v) FC(O)—CF$_2$—O—CF$_2$—C(O)F;
and/or
wherein compound (H) is a compound of formula:

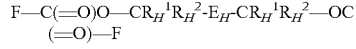

and wherein compound (H) is selected from the group consisting of:

(H-j) F—C(O)—O—(CH$_2$)$_2$—O—C(O)—F,
(H-jj) F—C(O)—O—(CH$_2$)$_3$—O—C(O)—F,
(H-jjj) F—C(O)—O—(CH$_2$)$_4$—O—C(O)—F,
(H-jv) F—C(O)—O—(CH$_2$)$_5$—O—C(O)—F, and
(H-v) F—C(O)—O—(CH$_2$)$_2$—O—(CH$_2$)$_2$—O—C(O)—F.

4. The method (P$_{FH}$) of claim 2, wherein Step (I) is performed in the presence of a fluoride-containing compound comprising at least one of (i) a metal fluoride of formula MeF$_y$, with Me being a metal having y valence, y being 1 or 2, in particular NaF, CaF$_2$, AgF, RbF, CsF, KF; and (ii) an (alkyl)ammonium fluoride of formula NR$^{HN}_4$F, with each of R$^{HN}$, equal to or different from each other being, independently, a H or an alkyl group; and optionally Step (I) is performed in the presence of at least one of Caesium fluoride (CsF), Potassium fluoride (KF), Silver fluoride (AgF), Rubidium fluoride (RbF) and tetra-n-butylammonium fluoride.

5. The method (P$_{FH}$) of claim 3, wherein after Step (I), the backbone of polymer chains of said polymer mixture (FH$_{FOR}$) consists essentially of a sequence of recurring units of formula (FH$_{unit}$):

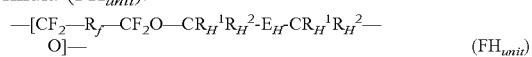

wherein
$R_f$ has the same meanings defined above for compound (F),
$E_H$, $R_H^1$ and $R_H^2$ have the same meanings defined in claim 3 for compound (H).

6. The method (P$_{FH}$) of claim 5, wherein polymer mixture (FH$_{FOR}$) is a mixture comprising variable amounts of any of compounds of formula:

(1)

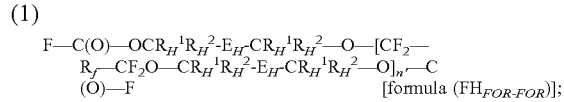

(2)

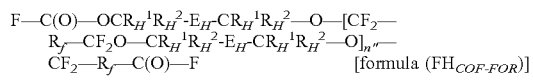

(3)

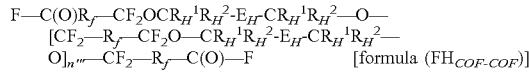

wherein n', n", and n'" are integers such that the molecular weight as measured by NMR analysis of the polymer ($FH_{FOR}$) is from 210 to 50 000; and $R_f$, $E_H$, $R_H^1$ and $R_H^2$ have the meanings as detailed in claim 5.

7. The method of claim 6, wherein polymer mixture ($FH_{CH2F}$) is a mixture comprising variable amounts of any compounds of formula:

(a)

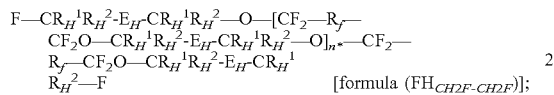

(b)

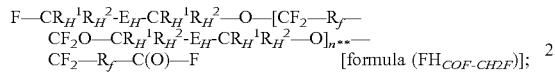

(c)

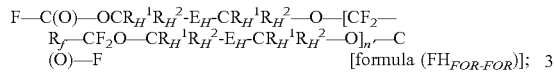

(d)

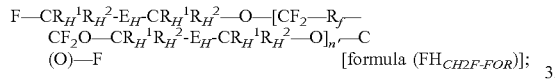

(e)

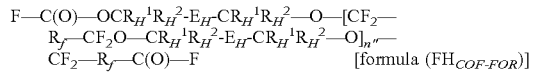

(f)

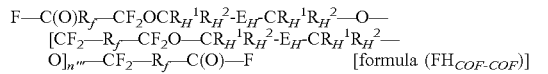

wherein n\*, n\*\*, n', n", and n'" are integers such that the molecular weight as measured by NMR analysis of the polymer mixture ($FH_{CH2F}$) is from 210 to 50 000, and wherein and wherein $R_f$, $E_H$, $R_H^1$ and $R_H^2$ are as detailed in claim 6.

8. The method of claim 6, said method comprising an additional step (III) including contacting polymer mixture ($FH_{CH2F}$) with a source of fluorine enabling at least partial fluorination of said polymer mixture ($FH_{CH2F}$), so as to obtain a fluorinated polymer mixture ($FF_{CF3}$).

9. The method of claim 8, wherein the source of fluorine in Step (III) is a gas containing molecular fluorine, and wherein said source of fluorine is fluorine gas ($F_2$).

10. The method of claim 9, wherein in Step (III), a halogenated olefin is contacted with polymer mixture ($FH_{CH2F}$) and fluorine source, and wherein said halogenated olefin is optionally selected from tetrafluoroethylene (TFE), hexafluoro-propylene (HFP), octafluorobutene, perfluoropentene, perfluorohexene, perfluoroheptene, perfluorooctene, perfluorocyclobutene, perfluorocyclopentene, perfluorocyclohexene, chlorotrifluoroethylene (CTFE), dichlorodifluoroethylene, chloropentafluoropropene, perfluorobutadiene, perfluoro-methylvinylether, perfluoro-ethylvinylether, perfluoro-propylvinylether; $CF_3OClC=CClF$, trichloroethylene, tetrachloroethylene, dichloroethylene isomers; and fluorodioxoles.

11. A method according to claim 10, wherein fluorination in Step (III) leads to substitution of hydrogen atoms in polymer mixture ($FH_{CH2F}$), so that, after step (III), the backbone of polymer chains of said polymer mixture ($FF_{CF3}$) consists essentially of a sequence of recurring units of formula ($FF_{unit}$):

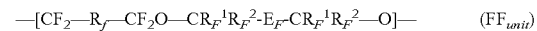

wherein $R_f$ has the same meanings defined above for compound (F), $E_F$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom, and each of $R_F^1$ and $R_F^2$, equal to or different from each other, is independently F or a $C_1$-$C_6$ fluorocarbon group.

12. The polymer mixture ($FH_{CH2F}$) of claim 1, comprising an amount of compounds

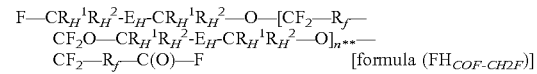

of at least 60 mole %, with respect to the total moles of compounds of formula ($FH_{CH2F-CH2F}$), formula ($FH_{COF-CH2F}$), formula ($FH_{FOR-FOR}$), formula ($FH_{CH2F-FOR}$), formula ($FH_{COF-FOR}$), and formula ($FH_{COF-COF}$).

13. The polymer mixture ($FH_{CH2F}$) of claim 1, comprising an amount of compounds

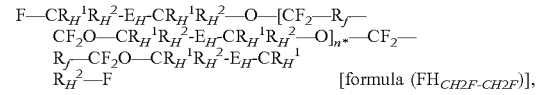

of at least 60 mole %, with respect to the total moles of compounds of formula ($FH_{CH2F-CH2F}$), formula ($FH_{COF-CH2F}$), formula ($FH_{FOR-FOR}$), formula ($FH_{CH2F-FOR}$), formula ($FH_{COF-FOR}$), and formula ($FH_{COF-COF}$).

14. A polymer mixture ($FH_{CH2F}$) according to claim 1, which is a mixture comprising variable amounts of compounds of formula:

(a')

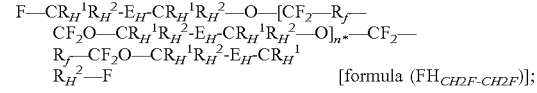

(b')

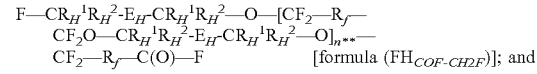

(e')

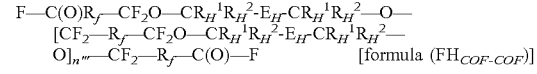

wherein n\*, n\*\*, n', n", and n'" are integers such that the molecular weight as measured by NMR analysis of the polymer mixture ($FH_{CH2F}$) is of from 210 to 50 000.

15. A polymer mixture ($FF_{CF3}$) comprising variable amounts of any of compounds of formula:

(a")

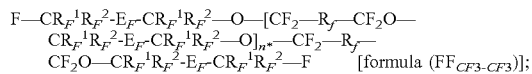 [formula (FF$_{CF3-CF3}$)];

(b")

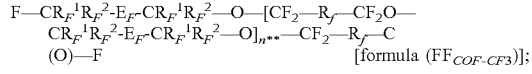 [formula (FF$_{COF-CF3}$)];

(c")

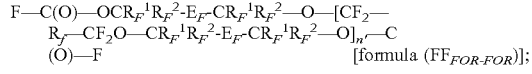 [formula (FF$_{FOR-FOR}$)];

(d")

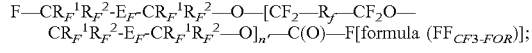[formula (FF$_{CF3-FOR}$)];

(e")

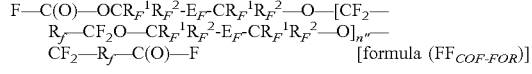 [formula (FF$_{COF-FOR}$)]

(f")

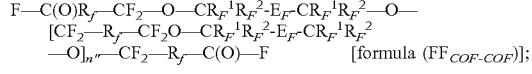 [formula (FF$_{COF-COF}$)];

and optionally further comprising one or more of the following compounds:

(b"$^{decarb}$)

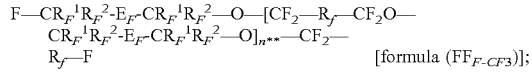 [formula (FF$_{F-CF3}$)];

(e"$^{decarb}$)

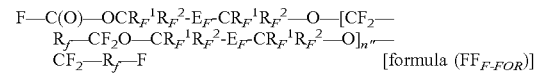 [formula (FF$_{F-FOR}$)]

(f"$^{decarb}$)

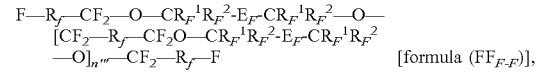 [formula (FF$_{F-F}$)], wherein:

$n^*$, $n^{**}$, $n'$, $n''$, and $n'''$ are integers such that the molecular weight as measured by NMR analysis of the polymer mixture (FF$_{CF3}$) is of from 210 to 50 000, —R$_f$ is a divalent, perfluoro linear or branched (oxy)alkylene chain, wherein said alkylene chain comprises from 1 to 10 carbon atoms and is optionally interrupted by one or more oxygen atoms;

E$_F$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom, and each of R$_F^1$ and R$_F^2$, equal to or different from each other, is independently F or a $C_1$-$C_6$ fluorocarbon group; and wherein in polymer mixture (FF$^{CF3}$):

the concentration of compound of formula (FF$_{CF3-CF3}$) is higher than the concentration of compound of formula (FF$_{FOR-FOR}$); and/or the concentration of compound of formula (FF$_{COF-CF3}$) is higher than the concentration of compound of formula (FF$_{COF-FOR}$).

* * * * *